United States Patent
Suzuki et al.

(10) Patent No.: US 7,355,715 B2
(45) Date of Patent: Apr. 8, 2008

(54) TEMPERATURE MEASURING APPARATUS, TEMPERATURE MEASUREMENT METHOD, TEMPERATURE MEASUREMENT SYSTEM, CONTROL SYSTEM AND CONTROL METHOD

(75) Inventors: Tomohiro Suzuki, Yamanashi (JP); Chishio Koshimizu, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 177 days.

(21) Appl. No.: 11/242,953

(22) Filed: Oct. 5, 2005

(65) Prior Publication Data
US 2006/0077394 A1 Apr. 13, 2006

Related U.S. Application Data

(60) Provisional application No. 60/622,807, filed on Oct. 29, 2004.

(30) Foreign Application Priority Data
Oct. 12, 2004 (JP) ............................. 2004-297877

(51) Int. Cl.
*G01B 9/02* (2006.01)
(52) U.S. Cl. ......................... 356/478; 385/12
(58) Field of Classification Search ................ 356/479, 356/477, 478; 385/12
See application file for complete search history.

(56) References Cited

U.S. PATENT DOCUMENTS

| | | | | |
|---|---|---|---|---|
| 4,367,040 A | * | 1/1983 | Goto | 356/44 |
| 6,066,210 A | * | 5/2000 | Yonemitsu et al. | 118/719 |
| 6,519,041 B1 | * | 2/2003 | Berthold | 356/477 |
| 6,687,036 B2 | * | 2/2004 | Riza | 359/204 |
| 2004/0212809 A1 | * | 10/2004 | Shim et al. | 356/479 |
| 2006/0114473 A1 | * | 6/2006 | Tearney et al. | 356/479 |
| 2006/0164653 A1 | * | 7/2006 | Everett et al. | 356/479 |
| 2007/0069152 A1 | * | 3/2007 | Lee et al. | 250/442.11 |

FOREIGN PATENT DOCUMENTS

| | | |
|---|---|---|
| JP | 9-318462 | 12/1997 |
| JP | 2001-203249 | 7/2001 |
| WO | WO 03/087744 | 10/2003 |
| WO | WO 3087744 A1 * | 10/2003 |

OTHER PUBLICATIONS

McCaulley et al, "Temperature dependence of the near-infred refractive index of silicon, gallium arsenide, and indium phosphide" Physcial Review B vol. 40, No. 11, pp. 7408-7417.

* cited by examiner

*Primary Examiner*—Tarifur Chowdhury
*Assistant Examiner*—Jonathan M Hansen
(74) *Attorney, Agent, or Firm*—Oblon, Spivak, McClelland, Maier & Neustadt, P.C.

(57) ABSTRACT

Light from a light source is split at a first splitter into a temperature measurement beam and a reference beam, the temperature measurement beam is further split at a second splitter into first through nth measurement beams, and the reference beam is reflected at a reference beam reflecting means. The first through nth measurement beams are radiated onto a temperature measurement target by ensuring that the optical path lengths of the first through nth measurement beams extending from the second splitter to the temperature measurement target are different from one another. By driving the reference beam reflecting means, the optical path length of the reference beam reflected at the reference beam reflecting means is altered, and concurrently, a light receiving means senses and measures interference induced by the first through and measurement beams reflected at the temperature measurement target and the reference beam reflected at the reference beam reflecting means.

20 Claims, 6 Drawing Sheets

TEMPERATURE MEASURING APPARATUS, TEMPERATURE MEASUREMENT METHOD, TEMPERATURE MEASUREMENT SYSTEM, CONTROL SYSTEM AND CONTROL METHOD

CROSS REFERENCE TO RELATED APPLICATIONS

This document claims priority to Japanese Patent Application Number 2004-297877, filed on Oct. 12, 2004 and U.S. Provisional Application No. 60/622,807, filed on Oct. 29, 2004, the entire content of which are hereby incorporated by reference.

FIELD OF THE INVENTION

The present invention relates to a temperature measuring apparatus, a temperature measurement method, a temperature measurement system, a control system and a control method with which the temperature at the front surface, the rear surface, an inner layer or the like at a measurement target such as a semiconductor wafer or a liquid crystal substrate can be measured accurately.

BACKGROUND OF THE INVENTION

It is crucial that the temperature of a work substrate processed by, for instance, a substrate processing apparatus, such as a semiconductor wafer (hereafter may be simply referred to as a "wafer") be measured with a high degree of accuracy in order to accurately control the shapes, the physical characteristics and the like of films, holes and the like formed on the wafer by executing various types of processing such as film formation and etching. Accordingly, various wafer temperature measurement methods have been proposed in the related art, including the use of a resistance thermometer and the use of a fluorescence thermometer that measures the temperature at the rear surface of the base material.

In recent years, research into temperature measurement methods and temperature measuring apparatuses that enable direct measurement of the wafer temperature, which is difficult with the temperature measurement methods in the related art, has gained significant ground. These technologies pertinent to direct temperature measurement include those disclosed in International Publication No. 03/087744 (Reference Literature 1) and Japanese Laid Open Patent Publication No. 2001-203249 (Reference Literature 2). A specific example of a temperature measuring apparatus enabling such direct measurement of the wafer temperature is now explained in reference to FIGS. 7 and 8. FIG. 7 illustrates the principal of a temperature measuring apparatus in the related art, whereas FIG. 8 is a conceptual diagram of interference waveforms measured with the temperature measuring apparatus.

The temperature measuring apparatus 10 in FIG. 7 is constituted with a low coherence interferometer achieved by adopting the basic principle of, for instance, a Michelson interferometer. The temperature measuring apparatus 10 includes a light source 12 constituted with, for instance, an SLD (super luminescent diode) having low coherence characteristics, a beam splitter 14 that splits the light originating from the light source 12 into two beams, i.e., a reference beam to be radiated onto a reference mirror 20 and a measurement beam to be radiated onto a temperature measurement target 30, the reference mirror 20 drivable along a single direction, with which the optical path length of the reference beam can be varied, and a light receiver 16 that receives the reference beam reflected at the reference mirror 20 and the measurement beam reflected at the temperature measurement target 30 and measures the extent of interference.

In this temperature measuring apparatus 10, the light originating from the light source 12 is split at the beam splitter 14 into two beams, i.e., the reference beam and the measurement beam. The measurement beam is radiated toward the temperature measurement target and is reflected at various layers, whereas the reference beam is radiated toward the reference mirror 20 and is reflected at the mirror surface. Then, both reflected light beams reenter the beam splitter 14, and depending upon the optical path length of the reference beam, the reflected light beams become superimposed upon each other, thereby inducing interference. The resulting interference wave is detected by the light receiver 16.

Accordingly, the reference mirror 20 is driven along the single direction to alter the optical path length of the radiated light for the temperature measurement. Since the coherence length of the light from the light source 12 is small due to the low coherence characteristics of the light source 12, intense interference manifests at a position at which the optical path length of the measurement beam and the optical path length of the reference beam match and the extent of interference is substantially reduced at other positions under normal circumstances. As the reference mirror 20 is driven along, for instance, the forward/backward direction (the direction indicated by the arrows in FIG. 7) and the optical path length of the reference beam is adjusted as described above, the reflected measurement beams from the individual layers (A layer and B layer) at the temperature measurement target with different refractive indices ($n_1$, $n_2$), the reflected reference beam interfere with each other and, as a result, interference waveforms such as those shown in FIG. 8 are detected. Thus, the measurement of the temperature at the temperature measurement target along the depthwise direction is enabled.

As the temperature of the temperature measurement target being heated with a heater or the like changes as shown in FIG. 8, the temperature measurement target expands. At this time, the refractive indices at the various layers at the temperature measurement target 30, too, become altered and, as a result, the interference waveform positions following the temperature change shift relative to the positions prior to the temperature change, which changes the intervals between the individual heat positions. The extent by which the peak positions of the interference waveforms change corresponds to the extent of the temperature change. In addition, the distances between the peak positions of the interference waveform correspond to the distance by which the reference mirror 20 moves. Thus, by accurately measuring the intervals between the peak positions in the interference waveforms based upon the distance by which the reference mirror 20 is displaced, the change in the temperature can be measured.

It is desirable that the temperature be measured at a plurality of measurement points instead of just a single measurement point in order to ensure that the processing within the surface of the wafer including the central area and peripheral areas is controlled with a high degree of consistency. For these purposes, the temperature may be detected at a plurality of measurement points by employing a plurality of temperature measuring apparatuses such as that described above each in correspondence to one of the measurement points.

However, if a plurality of temperature measuring apparatuses the quantity of which matches the number of measurement points are to be operated by moving the reference mirrors in the individual temperature measuring apparatuses to measure the interference waves at the various measurement points, the measurement becomes a laborious process. Furthermore, since matching numbers of light sources 12, reference mirrors 20 and light receivers 16 are required, the cost is bound to increase.

It is to be noted that technologies for enabling temperature measurement at a plurality of measurement points include that disclosed in Japanese Laid Open Patent Publication No. H09-318462 (Reference Literature 3). The publication teaches a system that includes a plurality of sensors each comprising a splitter, a measurement beam sensing fiber, a reference fiber for the reference beam and a reflector, with light originating from a single light source guided into the individual sensors via the respective splitters.

However, the principle of the technology disclosed in Reference Literature 3 described above is fundamentally different from the principle of the apparatus shown in FIG. 7 in that the light from the light source is converted to pulse light via a transmission gate and the pulse light is then allowed to enter the individual sensors. In other words, since the interference is measured by modulating the pulse light and then inputting the modulated pulse light to each sensor, which requires the reflected light to be input via a reception gate to each sensor, the temperatures at various measurement points cannot be measured all at once.

SUMMARY OF THE INVENTION

An object of the present invention, which has been completed by addressing the problems discussed above, is to provide a temperature measuring apparatus and the like adopting a simpler structure with which the temperatures at a plurality of measurement points can be measured at once, the labor and length of time required for the temperature measurement can be minimized and the cost can also be minimized.

In order to achieve the object described above, in an aspect of the present invention, a temperature measuring apparatus comprising a light source, a first splitter that splits light originating from the light source into a temperature measurement beam and a reference beam, a second splitter that further splits the temperature measurement beam from the first splitter into n measurement beams, i.e., first through nth measurement beams, a reference beam reflecting means for reflecting the reference beam from the first splitter, an optical path length altering means for altering the optical path length of the reference beam reflected at the reference beam reflecting means, a reflected light transmitting means for transmitting the reference beam from the first splitter to a reference beam irradiating position at which the reference beam is radiated onto the reference beam reflecting means, first through nth measurement beam transmitting means for transmitting the first through nth measurement beams from the second splitter to specific measurement beam irradiating positions at which the first through nth measurement beams are radiated onto various measurement points at a temperature measurement target, and a light receiving means for measuring interference of the first through nth measurement beams reflected from the temperature measurement target with the reference beam reflected from the reference beam reflecting means, which is characterized in that the optical path lengths of the first through nth measurement beams extending from the second splitter to the temperature measurement target are different from one another, is provided.

In order to achieve the object described above, in another aspect of the present invention, a temperature measurement method comprising a step in which n measurement beams, i.e., first through nth measurement beams, with optical path lengths thereof different from one another are each radiated onto one of various measurement points at a temperature measurement target and a reference beam is radiated onto a reference beam reflecting means, a step in which interference of the first through nth measurement beams reflected from the temperature measurement target with the reference beam reflected from the reference beam reflecting means is measured while altering the optical path length of the reference beam reflected from the reference beam reflecting means by moving the reference beam reflecting means along a single direction, and a step in which the temperatures at the individual measurement points at the temperature measurement target are measured based upon the results of the interference measurement, is provided.

By adopting the apparatus and the method according to the present invention described above, a non-contact temperature measurement through which the temperatures at a plurality of measurement points can be accurately measured all at once is enabled in a simple structure that includes the second splitter for splitting the temperature measurement beam from the light source into the required number of measurement beams and the measurement beam transmitting means for transmitting the individual measurement beams disposed so as to vary the optical path lengths of the individual measurement beams. As a result, the number of measurement points can be increased with ease while minimizing the cost and, at the same time, minimizing the labor and the length of time required for the temperature measurement.

In addition, in the apparatus it is desirable that the intensity ratio of the temperature measurement beam and the reference beam obtained by splitting the light from the light source at the first splitter in the apparatus and the method described above me, for instance, n:1 and that the intensity levels of the first through nth measurement beams obtained by splitting the measurement beam at the second splitter each be 1/n of the intensity of the temperature measurement beam. Since this equalizes the intensity of the first through nth measurement beams to the intensity of the reference beam, an interference waveform which facilitates measurement of, for instance, the peak interval or the like is achieved in correspondence to each measurement beam.

In the apparatus and the method described above, a shutter means capable of turning on/off the radiation of the first through nth measurement beams onto the temperature measurement target may be disposed between the individual measurement beam irradiating positions at which the first through nth measurement beams are radiated and the temperature measurement target. The addition of such a shutter means makes it possible to measure the temperature at a desired measurement point alone by radiating the measurement beam onto the specific measurement point.

In the apparatus and the method described above, the temperature measurement target may be a work substrate (such as a semiconductor wafer or a liquid crystal substrate) processed by a substrate processing apparatus and the first through nth measurement beam transmitting means may be disposed at the substrate processing apparatus so as to radiate the first through nth measurement beams onto a plurality of measurement points within the surface of the work substrate. In this case, the temperatures at the plurality of measurement points within the surface of the work substrate such as a semiconductor wafer can be measured all at once.

In addition, in an implementation of the apparatus and the method, the substrate processing apparatus may comprise a processing chamber in which a specific type of processing is executed on the work substrate and a transfer chamber connected to the processing chamber, through which the work substrate is transferred into/out of the processing chamber, with at least one of the first through nth measurement beam transmitting means disposed at the transfer chamber so as to make it possible to irradiate the work substrate present in the transfer chamber with a measurement beam. In this case, the temperature of another work substrate present in the transfer chamber as well as the temperature of the work substrate in the processing chamber can be measured at once.

In the apparatus and the method described above, the temperature measurement target may include a focus ring disposed around the work substrate as well as the work substrate processed by the substrate processing apparatus, with at least one of the first through nth measurement beam transmitting means disposed so as to irradiate the focus ring with a measurement beam. In this case, the temperature of the focus ring in addition to the temperature of the work substrate can be measured at once.

Alternatively, in the apparatus and the method described above, the temperature measurement target may be an upper electrode disposed inside the processing chamber of the substrate processing apparatus, with at least one of the first through nth measurement beam transmitting means disposed so as to irradiate the upper electrode with a measurement beam. In this case, the temperatures at a plurality of measurement points at the upper electrode can be measured all at once. Furthermore, the temperature of the upper electrode can be measured in addition to and together with the temperature at the work substrate and the temperature at the focus ring.

During the step in which the temperature of the temperature measurement target is measured based upon the results of the interference measurement in the method described above, the temperatures at the temperature measurement target may be calculated based upon, at least, the measurement results obtained by measuring an optical path lengths of the first through nth measurement beams in correspondence to the interference waves and the optical path length initial value inherent to the temperature measurement target. This method is particularly effective with temperature measurement targets such as semiconductor wafers the thickness of which does not remain constant from wafer to wafer, since the temperature of a given wafer can be measured even more accurately through a temperature conversion executed in correspondence to the thickness of the particular semiconductor wafer.

In order to achieve the object described above, in another aspect of the present invention, a temperature measurement system comprising a substrate processing apparatus and a temperature measuring apparatus, which is characterized in that the substrate processing apparatus includes at least a processing chamber in which a specific type of processing is executed on the work substrate, that the temperature measuring apparatus comprises a light source, a first splitter that splits light originating from the light source into a temperature measurement beam and a reference beam, a second splitter that further splits temperature the measurement beam from the first splitter into n measurement beams, i.e., first through nth measurement beams, a reference beam reflecting means for reflecting the reference beam from the first splitter, an optical path length altering means for altering the optical path length of the reference beam reflected at the reference beam reflecting means, a reflected light transmitting means for transmitting the reference beam from the first splitter to a reference beam irradiating position at which the reference beam is radiated onto the reference beam reflecting means, first through nth measurement beam transmitting means for transmitting the first through nth measurement beams from the second splitter to specific measurement beam irradiating positions at which the first through nth measurement beams are radiated onto various measurement points at the work substrate and a light receiving means for measuring interference of the first through nth measurement beams reflected from the work substrate with the reference beam reflected from the reference beam reflecting means, and that the optical path lengths of the first through nth measurement beams extending from the second splitter to the work substrate are different from one another, is provided. By adopting such a temperature measurement system according to the present invention, the temperatures at a plurality of measurement points within the surface of a work substrate placed inside the processing chamber at the substrate processing apparatus, for instance, can be measured all at once.

In order to achieve the object described above, in yet another aspect of the present invention, a control system comprising a substrate processing apparatus and a temperature measuring apparatus and a control device which is characterized in that the substrate processing apparatus includes at least a processing chamber in which a specific type of processing is executed on the work substrate, that the temperature measuring apparatus comprises a light source, a first splitter that splits light originating from the light source into a temperature measurement beam and a reference beam, a second splitter that further splits the temperature measurement beam from the first splitter into n measurement beams, i.e., first through nth measurement beams, a reference beam reflecting means for reflecting the reference beam from the first splitter, an optical path length altering means for altering the optical path length of the reference beam reflected at the reference beam reflecting means, a reflected light transmitting means for transmitting the reference beam from the first splitter to a reference beam irradiating position at which the reference beam is radiated onto the reference beam reflecting means, first through nth measurement beam transmitting means for transmitting the first through nth measurement beams from the second splitter to specific measurement beam irradiating positions at which the first through nth measurement beams are radiated onto various measurement points at the work substrate and a light receiving means for measuring interference of the first through nth measurement beams reflected from the work substrate with the reference beam reflected from the reference beam reflecting means, that the optical path lengths of the first through nth measurement beams extending from the second splitter to the work substrate are different from one another, and that the control device calculates the temperatures at the individual measurement points at the work substrate based upon the interference waves induced by the first through nth measurement beams and the reference beam and having been measured by the light receiving means and implements at least either temperature control or process control for the work substrate placed inside the processing chamber at the substrate processing apparatus based upon the temperatures thus calculated, is provided.

By adopting such a control system according to the present invention, the temperatures at a plurality of measurement points within the surface of a work substrate placed inside the processing chamber at the substrate processing apparatus, for instance, can be measured all at once and temperature control or process control for the work substrate can be executed based upon the temperatures at the work substrate itself, which enables accurate control of the process characteristics manifesting within the surface of the work substrate and improves the stability of the substrate processing apparatus.

In addition, in the control system described above, the substrate processing apparatus may include a focus ring disposed around the work substrate placed inside the processing chamber, with at least one of the first through nth measurement beam transmitting means disposed so as to irradiate the focus ring with a measurement beam. In such a case, the control device should calculate the temperature of the focus ring as well based upon an interference waves from the light receiving means so as to execute at least either the temperature control or the process control for the work substrate present inside the processing chamber at the substrate processing apparatus by taking into consideration the temperature at the focus ring as well. Since the temperature control or the process control for the work substrate can be executed by taking into consideration the temperature at the focus ring in this manner, the process characteristics manifesting at an edge of the work substrate, too, can be controlled accurately.

In the control system described above, the substrate processing apparatus may include an upper electrode disposed inside the processing chamber, with at least one of the first through nth measurement beam transmitting means disposed so as to irradiate the upper electrode with a measurement beam. In such a case, the control device should calculate the temperature of the upper electrode as well so as to execute at least either the temperature control or the process control for the work substrate present inside the processing chamber at the substrate processing apparatus by taking into consideration the temperature at the upper electrode as well. Since the temperature control or the process control for the work substrate can be executed by taking into consideration the temperature at the upper electrode in this manner, the process characteristics manifesting within the surface of the work substrate can be controlled even more accurately.

In order to achieve the object described above, in yet another aspect of the present invention, a control method to be adopted in a control system for a substrate processing apparatus that executes a specific type of processing on a work substrate, comprising a step in which n measurement beams, i.e., first through nth measurement beams, with optical path lengths thereof different from one another are each radiated onto one of various measurement points at a work substrate and a reference beam is radiated onto a reference beam reflecting means, a step in which interference of the first through nth measurement beams reflected from the work substrate with the reference beam reflected from the reference beam reflecting means is measured while altering the optical path length of the reference beam reflected from the reference beam reflecting means by moving the reference beam reflecting means along a single direction, a step in which the temperatures at the individual measurement points at the work substrate are measured based upon the results of the interference measurement and a step in which at least either temperature control or process control for the work substrate at the substrate processing apparatus is executed based upon the temperatures at the individual measurement points at the work substrate having been measured, is provided.

Through the control method according to the present invention described above, the temperatures at a plurality of measurement points within the surface of a work substrate placed inside the processing chamber at the substrate processing apparatus, for instance, can be measured all at once and temperature control or process control for the work substrate can be executed based upon the temperatures at the work substrate itself, which enables accurate control of the process characteristics manifesting within the surface of the work substrate and improves the stability of the substrate processing apparatus.

DETAILED DESCRIPTION OF PREFERRED EMBODIMENTS

Figure 1:
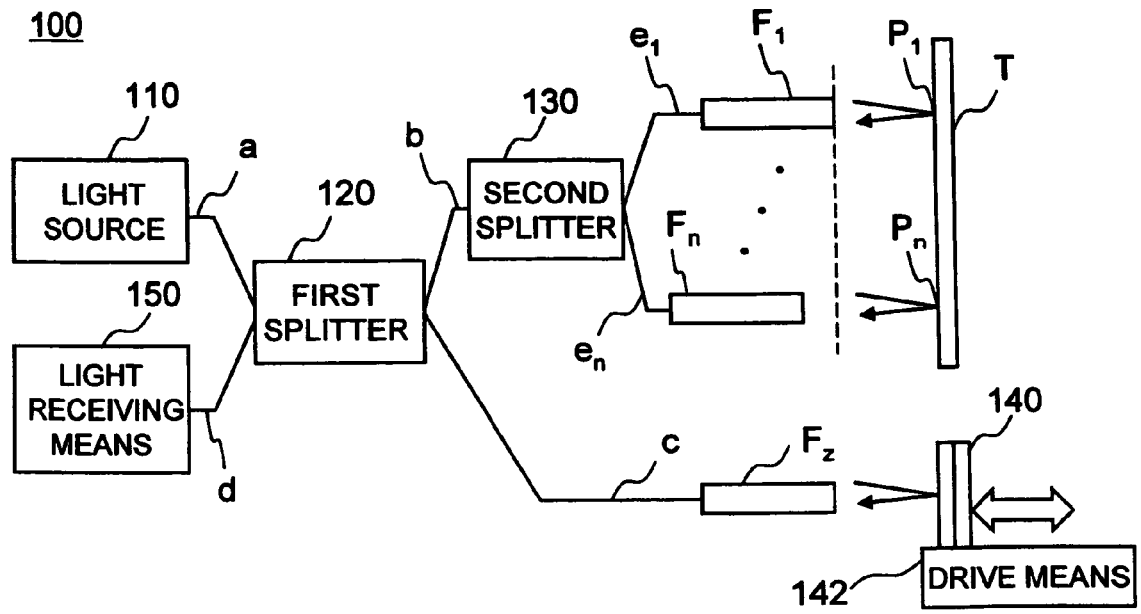
FIG. 1 is a block diagram schematically illustrating the structure adopted in the temperature measuring apparatus achieved in an embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

(Temperature Measuring Apparatus)

Figure 7:
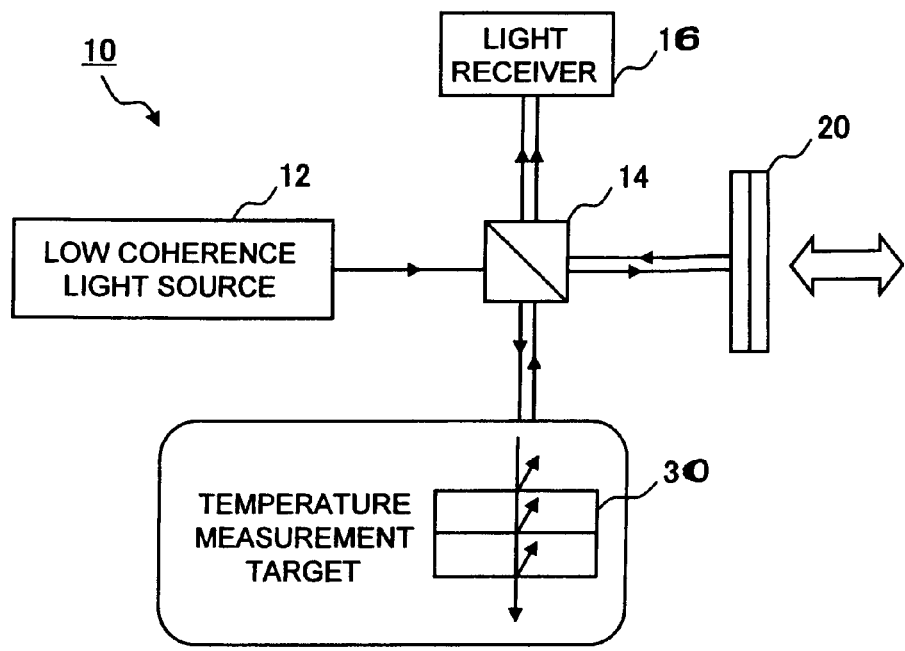
FIG. 7 illustrates the principal of a temperature measuring apparatus in the related art.
Figure 8:
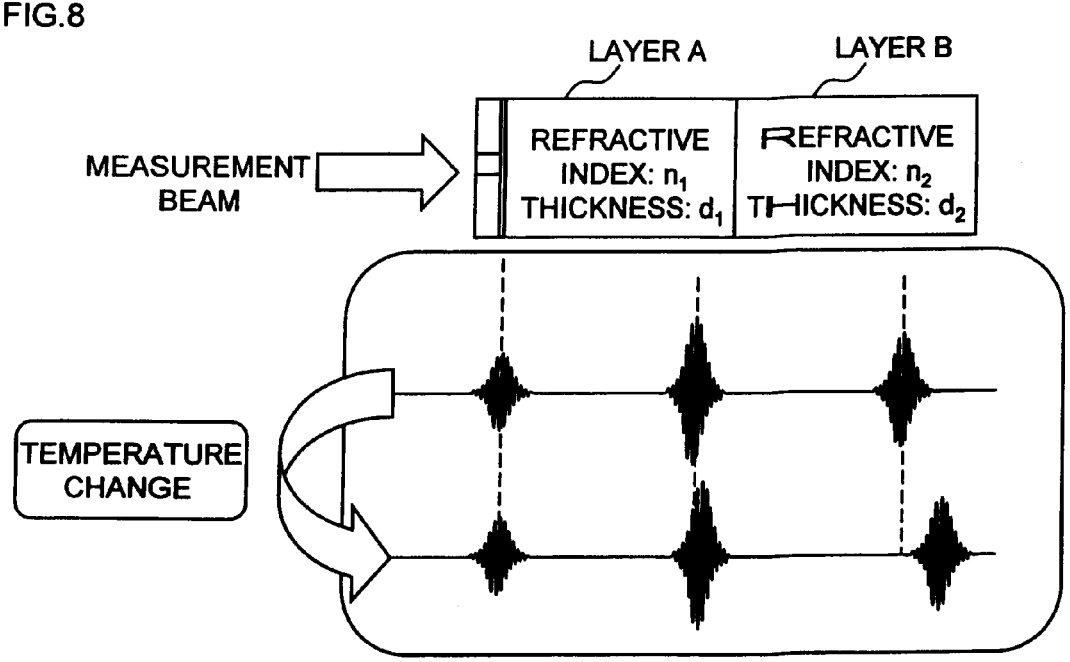
FIG. 8 conceptually illustrates interference waveforms measured with the temperature measuring apparatus shown in FIG. 7.

The temperature measuring apparatus achieved in an embodiment of the present invention is now explained in reference to drawings. FIG. 1 is a block diagram schematically illustrating the structure adopted in the temperature measuring apparatus achieved in an embodiment. With the temperature measuring apparatus 100 achieved in the embodiment, the temperatures at a plurality of measurement points can be measured all at once simply by scanning the reference beam reflecting means such as a reference mirror just once based upon the principal explained earlier in reference to FIG. 7. The specific structure assumed in this temperature measuring apparatus 100 is described below.

As shown in FIG. 1, the temperature measuring apparatus 100 comprises a light source 110, a first splitter 120 at which light originating from the light source 110 is split into a temperature measurement beam and a reference beam, and a second splitter 130 at which the temperature measurement beam from the first splitter 120 is further split into n measurement beams, first through nth measurement beams. In addition, the temperature measuring apparatus 100 includes a reference beam reflecting means 140 for reflecting the reference beam from the first splitter 120 and an optical path length altering means for altering the optical path length of the reference beam reflected from the reference beam reflecting means 140. The optical path length altering means is constituted with a drive means 142 such as a motor that drives the reference beam reflecting means 140, which may be constituted with, for instance, a reference mirror, along a single direction parallel to the direction in which the reference beam enters. By driving the reference mirror along a single direction in this manner, the optical path length of the reference beam reflected from the reference mirror can be altered.

The temperature measuring apparatus 100 further includes a light receiving means 150 for measuring the interference of the first through nth measurement beams reflected from a temperature measurement target T such as a wafer when the first through nth measurement beams are radiated onto first through nth measurement points at the temperature measurement target T with the reference beam reflected from the reference beam reflecting means 140 as the reference beam is radiated onto the reference beam reflecting means 140.

No particular restrictions are imposed with regard to the type of light that should be emitted from the light source 110 of the temperature measuring apparatus 100 as long as it enables measurement of the interference manifesting between the measurement beams and the light beams. If the temperature measurement target T is a wafer, for instance, the light from the light source 110 should be such that no interference is induced at least with reflected light beams from points set apart by the distance between the front surface and the rear surface of the wafer (approximately 800 to 1500 μm under normal circumstances). More specifically, it is desirable to use, for instance, low coherence light. The term "low coherence light" refers to light with a small coherence length. It is desirable that the central wavelength of the low coherence light be 0.3 to 201 μm and it is even more desirable that the central wavelength be 0.5 to 5 μm. In addition, it is desirable that the coherence length be, for instance, 0.1 to 100 μm and it is even more desirable to use light with a coherence length equal to or less than 3 μm. By using the light source 110 that emits such low coherence light, any problems attributable to unnecessary interference can be avoided and the interference of the reflected light from the front surface or an inner layer at the wafer with the reference beam can be measured with ease.

Light sources that generate the type of low coherence light described above include, for instance, an SLD (super luminescent diode), an LED, a high brightness lamp (such as a tungsten lamp or a xenon lamp) and a super wideband wavelength light source. It is particularly desirable to use an SLD with its high brightness performance as the light source 110, among these low coherence light sources.

An optical fiber coupler, for instance, may be used as the first splitter 120. However, the present invention does not limit the first splitter 120 to an optical fiber coupler, and any type of splitter may be used as long as it is capable of splitting light into a reference beam and a measurement beam. An optical fiber coupler may be used as the second splitter 130. However, the present invention does not limit the second splitter 130 to an optical fiber coupler either, and any type of splitter may be used as long as it is capable of splitting the measurement beam into the first through nth measurement beams. The first splitter 120 and the second splitter 130 may each be constituted with, for instance, a light waveguide channel-type wave splitter, a semi-transparent mirror or the like, instead.

The reference beam reflecting means 140 may be constituted with, for instance, a reference mirror. The reference mirror may be, for instance, a corner cube prism or a plane mirror. It is particularly desirable to use a corner cube prism, which assures the desired parallelism between the reflected light and the incident light. However, as long as the reference beam reflecting means is capable of reflecting the reference beam, the reference mirror may be constituted with, for instance, a delay line, (as in the case of the optical path altering means constituted with a piezotube delay line, which is to be detailed later), instead of a corner cube prism.

It is desirable to constitute the drive means 142 for driving the reference beam reflecting means 140 with a stepping motor that drives the reference beam reflecting means 140 along a direction (the direction indicated by the arrows in FIG. 1) parallel to the direction in which the reference beam enters. By employing a stepping motor, the distance over which the reference beam reflecting means 140 is displaced can be detected with ease based upon the motor drive pulses. However, as long as it is capable of altering the optical path length of the light reflected from the reference beam reflecting means, a piezotube delay line, a rectilinear displacement stage type delay line or a multilayer piezo delay line as well as a voice coil motor delay line, which employs a voice coil motor, may be used instead of the motor described above to constitute the optical path length altering means.

It is desirable to constitute the light receiving means 150 with, for instance, an inexpensive and compact photodiode. More specifically, the light receiving means 150 may be constituted with a PD (photo detector) achieved by using, for instance, an Si photodiode, an InGaAs photodiode or a Ge photodiode. However, the present invention is not limited to the examples listed above, and the light receiving means 150 may instead be constituted with an avalanche photodiode, a photomultiplier or the like, as long as the interference between the measurement beams from the temperature measurement target T and the reference beam reflected from the reference beam reflecting means 140 can be measured.

The reference beam from the first splitter 120 is transmitted via a reflected light transmitting means such as a collimate fiber $F_z$ to a reference beam irradiating position at which the reference beam is radiated onto the reference beam reflecting means 140, whereas the first through nth measurement beams from the second splitter 130 are transmitted via first through nth measurement beam transmitting means such as collimate fibers $F_1$ through $F_n$ to measurement beam irradiating positions at which the measurement beams are radiated onto the temperature measurement target T. It is to be noted that the first through nth measurement beam transmitting means may be alternatively constituted with, for instance, optical fibers $F_1$ to $F_n$ each equipped with a collimator, which are achieved by mounting collimators at the front ends of optical fibers, instead of the collimate fibers $F_1$ to $F_n$ described above.

(Optical Path Lengths of the First Through nth Measurement Beams)

In the temperature measuring apparatus 100 shown in FIG. 1, the optical path lengths of the first through nth measurement beams extending from the second splitter 130 to the temperature measurement target T differ from one another. In more specific terms, if the lengths of the collimate fibers $F_1$ to $F_n$ are equal, the first through nth measurement beam transmitting means such as the collimate fibers $F_1$ to $F_n$ should be disposed so that their front end surfaces, i.e., the measurement beam irradiating positions, are offset relative to the temperature measurement target T by varying extents along the direction substantially parallel to the radiating direction, as shown in FIG. 1. If optical fibers $F_1$ to $F_n$ equipped with collimators are used as the first through nth measurement beam transmitting means, the first through nth measurement beam transmitting means are disposed so that the front end surfaces of the individual collimators are offset relative to the temperature measurement target T by varying extents along the direction substantially parallel to the radiating direction. It is to be noted that the optical path lengths of the first through nth measurement beams extending from the second splitter 130 to the temperature measurement target T may be varied without offsetting the front end surfaces of the collimate fibers $F_1$ to $F_n$ or the front end surfaces of the collimators at the optical fibers $F_1$ to $F_n$ equipped with collimators by varying the lengths of the collimate fibers $F_1$ to $F_n$ or the lengths of the optical fibers.

When the first through nth measurement beam transmitting means are disposed by offsetting them relative to the temperature measurement target T, it is necessary to ensure that the interference waves (see, for instance, FIG. 3) induced by the first through nth measurement beams and the reference beam, which are measured at the individual measurement points, at least, are not superimposed upon one another. For instance, if the light source 110 is a low coherence light source, any overlap of the interference waves can be prevented by disposing the first through nth measurement beam transmitting means at positions offset relative to the temperature measurement target T, with each position distanced from the next position by an extent equal to or greater than the coherence length of the interference waves. In addition, it is desirable to determine the positions at which the first through nth measurement beam transmitting means are to be disposed by taking into consideration the thickness of the temperature measurement target, the rate at which the thickness changes, the temperature measurement range, the distance by which the reference mirror is moved and the like. More specifically, in the case of a silicon wafer having a thickness of approximately 0.7 mm, the reference mirror is moved by a distance of approximately 0.04 mm in the temperature range of room temperature to 200° C. and, accordingly, it is desirable to dispose the first through nth measurement beam transmitting means by offsetting them relative to the temperature measurement target T, at positions distanced from each other by approximately 0.1 mm. With the first through nth measurement beam transmitting means disposed at such positions, it is ensured that the interference waves corresponding to the individual measurement points do not overlap.

Figure 2:
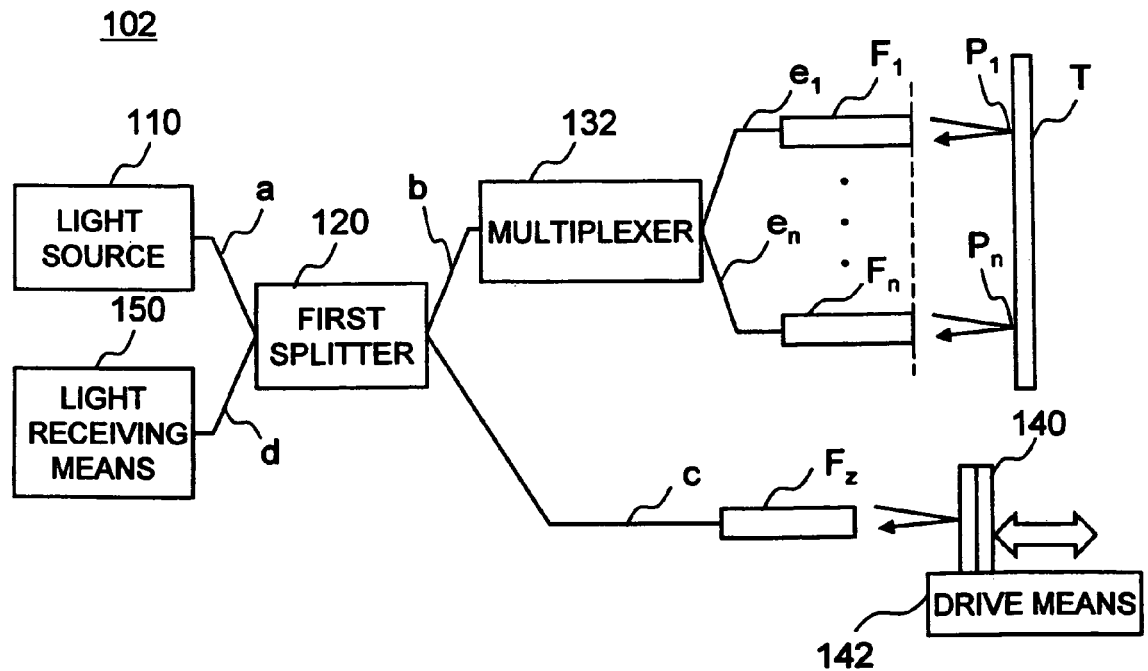
FIG. 2 is a block diagram schematically illustrating the structure adopted in a temperature measuring apparatus in a comparison example.

FIG. 2 shows a temperature measuring apparatus 102 in which the optical path lengths of the first through nth measurement beams to the temperature measurement target T are all equal, representing an example to be compared with the temperature measuring apparatus in FIG. 1. The temperature measuring apparatus 102 in FIG. 2 differs from that shown in FIG. 1 in that a multiplexer for optical communication (an OADM: optical add/drop multiplexer) 132 is used in place of the second splitter 130, so as to measure the temperatures at the individual measurement points by switching to the first through nth measurement beams with the optical communication multiplexer 132.

If the optical path lengths of the first through nth measurement beams extending to the temperature measurement target T are equal as in this example and the second splitter 130 in FIG. 1 is used to split the measurement beam into the first through nth measurement beams, the interference waves induced by the first through nth measurement beams reflected from the temperature measurement target T and the reference beam overlap with each other and become indistinguishable. For this reason, the interference waves corresponding to the individual measurement points cannot be measured simply by scanning the reference beam reflecting means 140 such as a reference mirror just once.

Accordingly, in the temperature measuring apparatus 102 in FIG. 2, the optical communication multiplexer 132 is used to switch to one of the first through nth measurement beams and measure the temperature at the corresponding measurement point, which makes it necessary to scan the reference beam reflecting means 140 a number of times matching the number of measurement points. As a result, the temperature measurement becomes a laborious and time-consuming process.

In contrast, in the temperature measuring apparatus 100 in FIG. 1, the optical path lengths of the first through nth measurement beams extending from the second splitter 130 to the temperature measurement target T are varied, and by adjusting these optical path lengths to optimal values, the waveforms of the interference waves induced by the first through nth measurement beams and the reference beam are offset from one another, thereby facilitating detection thereof. Since the individual waveforms of the interference waves induced by the first through nth measurement beams and the reference beam do not overlap, the interference waves at the measurement points irradiated with the first through nth measurement beams can be detected all at once simply by scanning the reference beam reflecting means 140 such as a reference mirror just once. Consequently, the length of time required for the temperature measurement is minimized.

As described above, the temperature measuring apparatus achieved in the embodiment, adopting a simple structure which includes the second splitter 130 constituted with an optical fiber coupler or the like to split the temperature measurement beam into the first through nth measurement beams and the first through nth measurement beam transmitting means disposed so as to vary the optical path lengths of the first through nth measurement beams with respect to one another, is capable of detecting the temperatures at a plurality of measurement points all at once. With such a temperature measuring apparatus, the length of time required for temperature measurement can be minimized while keeping costs down.

It is to be noted that the intensity ratio of the temperature measurement beam and the reference beam obtained by splitting the light from the light source at the first splitter should be, for instance, n:1 and that the intensity levels of the first through nth measurement beams obtained by splitting the temperature measurement beam at the second splitter should each be 1/n of the intensity of the measurement beam. Since this equalizes the intensity of the first through nth measurement beams to the intensity of the reference beam, an interference waveform which facilitates measurement of, for instance, the peak interval or the like is achieved in correspondence to each measurement beam. However, the intensity of the individual beams is not limited to this example and, for instance, the intensity levels of the first through nth measurement beams may be different from one another. In such a case, the sizes of the peaks in the interference waveforms corresponding to the individual measuring points are different from one another, which makes it possible to distinguish with ease the interference waveforms corresponding to each measurement point.

In addition, a shutter means (not shown) capable of turning on/off the radiation of the first through nth measurement beams onto the temperature measurement target T may be disposed between the individual measurement beam irradiating positions at which the first through nth measurement beams are radiated and the temperature measurement target T. For instance, if the temperature at a first measurement point alone needs to be detected, a shutter means should be engaged to turn on the first measurement beam alone with the other measurement beams, the second through nth measurement beams sustained in an off state, and then, the reference beam reflecting means (e.g., a reference mirror) 140 should be driven to obtain the interference waves induced by the first measurement beam alone. In addition, the shutter means may be engaged to turn on the measurement beams corresponding to a plurality of measurement points, with the measurement beams corresponding to the remaining measurement points sustained in an off state. The addition of such a shutter means makes it possible to measure the temperature at a desired measurement point alone by radiating the measurement beam onto the measurement point.

(Operation of the Temperature Measuring Apparatus)

In the temperature measuring apparatus 100 adopting the structure described above, the light originating from the light source 110 enters the first splitter 120 through a terminal a, and the light is split at the first splitter 120 into two beams, one of which is then directed to a terminal b with the other directed to a terminal c. The beam (the temperature measurement beam) directed to the terminal b then enters the second splitter 130 and the measurement beam is split into n beams to be respectively directed to terminals $e_1$ through $e_n$ at the second splitter 130. The first through nth measurement beams departing the terminals $e_1$ through $e_n$ are radiated onto the temperature measurement target T such as a wafer having a layer structure, respectively via the first through nth measurement beam transmitting means that may each be constituted with a collimate fiber. The first through nth measurement beams are then reflected from the front surfaces, interfaces or the rear faces of the individual layers.

The beam (the reference beam) directed to the terminal c then enters and exits the reference beam transmitting means such as a collimate fiber and is reflected by the reference beam reflecting means (e.g., a reference mirror) 140. The reflected first through nth measurement beams then enter the first splitter 120 via the second splitter 130 and are recombined with the reflected reference beam at the first splitter 120. Consequently, the interference waveforms are detected at the light receiving means 150 constituted with a PD which is achieved by using, for instance, an Si photodiode, an InGsAs photodiode or a Ge photodiode.

(Specific Examples of Induced Waveforms of Interference of Measurement Beams and a Reference Beam)

Figure 3A:
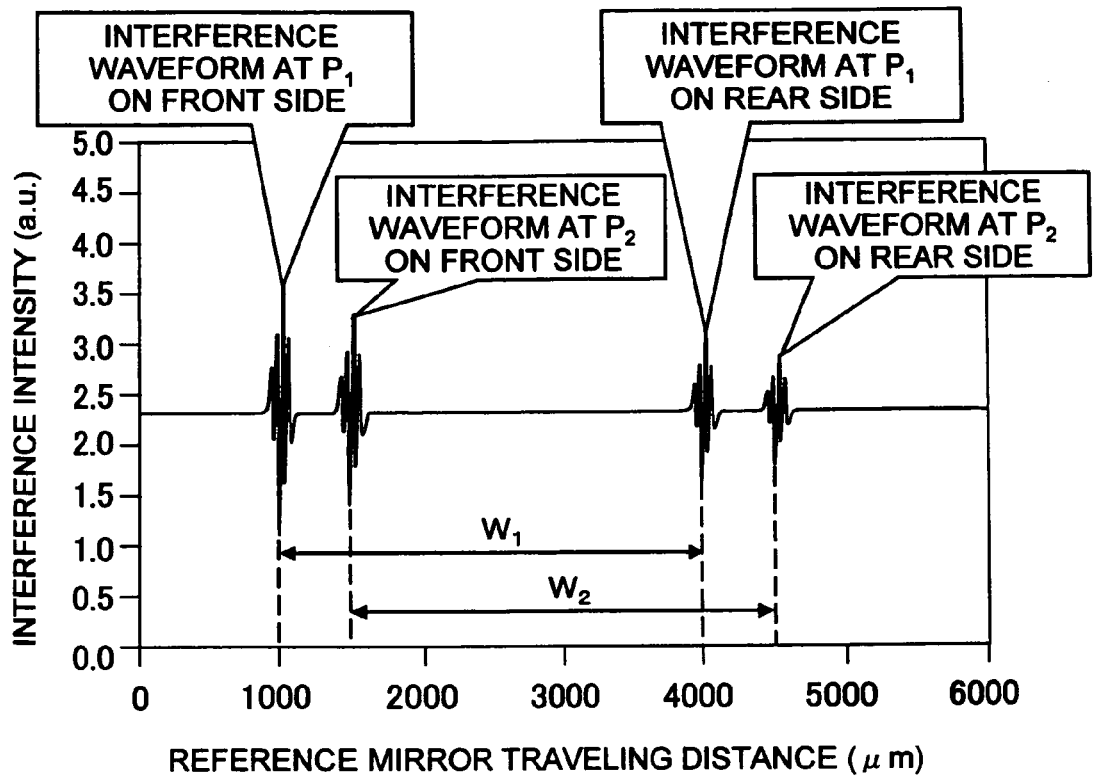
FIG. 3 presents specific examples of interference waves induced by measurement beams and a reference beam with the temperature measuring apparatus achieved in the embodiment, with FIG. 3A presenting an example of interference waves manifesting before the temperature at the temperature measurement target changes and FIG. 3B presenting an example of interference waves manifesting after the temperature at the temperature measurement target changes.
Figure 3B:
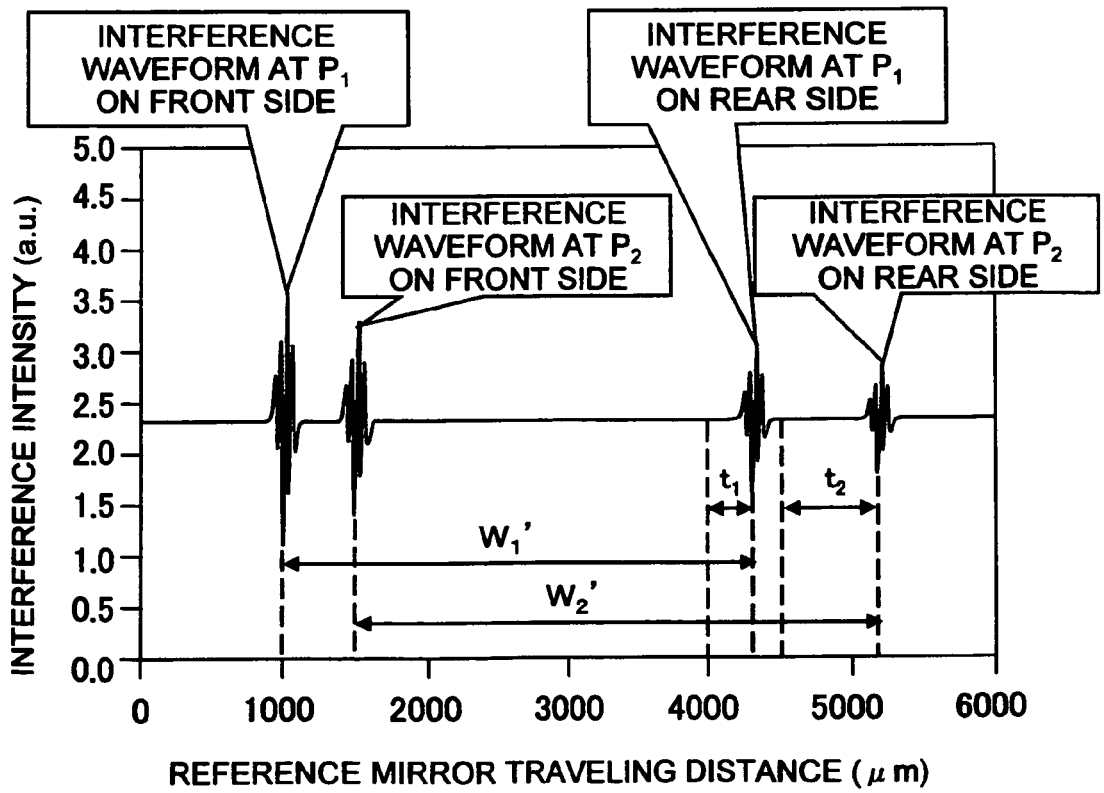

FIG. 3 presents a specific example of interference waveforms and that may be obtained with the temperature measuring apparatus 100. FIG. 3 shows the waveforms of the interference of the first and second measurement beams, which are obtained by further splitting the measurement beam from the first splitter at the second splitter and are respectively radiated onto measurement points $P_1$ and $P_2$ within the surface of the temperature measurement target such as a wafer, with the reference beam. FIG. 3A shows the interference waveforms observed prior to a temperature change, whereas FIG. 3B shows the interference waveforms observed after the temperature change. The vertical axis in FIG. 3 represents the interference intensity and the horizontal axis represents the distance by which the reference mirror is moved.

In addition, the light source 110 is a low coherence light source as described earlier. When a low coherence light source 110 which emits light with a small coherence length is used, intense interference occurs where the optical path length of a measurement beam and the optical path length of the reference beam match but the extent of interference is substantially lowered elsewhere under normal circumstances. Accordingly, by driving the reference beam reflecting means (such as a reference mirror) 140 forward/backward along, for instance, the direction in which the reference beam is radiated so as to alter the optical path length of the reference beam, interference of the measurement beam and the reflected reference beam can be induced at any layer within the wafer as well as at the front surface and the rear surface of the wafer, i.e., the temperature measurement target T due to the difference between their refractive indices. Measurement of the temperature at the wafer along the depthwise direction is thus enabled.

As FIGS. 3A and 3B indicate, an interference wave induced by the reference beam in correspondence to the measurement point $P_1$ at the front surface of the temperature measurement target wafer T first manifests and then an interference wave induced by the reference beam in correspondence to the measurement point $P_2$ at the wafer front surface manifests as the reference beam reflecting means (such as a reference mirror) 140 is scanned along the specific direction. As the reference beam reflecting means 140 is further scanned, an interference wave induced by the reference beam in correspondence to the measurement point $P_2$ at the rear surface of the wafer manifests and an interference wave induced by the reference beam at the measurement point $P_2$ at the rear surface manifests. Thus, the interference waves manifesting on the front surface and the rear surface at the measurement points $P_1$ and $P_2$ irradiated with the first and second measurement beams can be detected all at once simply by scanning the reference beam reflecting means 140 just once.

(Interference Light-Based Measurement of Temperature)

Next, an explanation is given on a method that may be adopted to measure the temperature based upon interference waves induced by a measurement beam and the reference beam. Methods that may be adopted to measure temperature based upon interference waves include the temperature conversion method that is achieved by detecting a change in the optical path length resulting from a temperature change. In reference to the embodiment, a temperature conversion method achieved by detecting positional changes of the interference waveforms is explained.

As the temperature measurement target wafer T is heated with a heater or the like, the temperature measurement target T expands, inducing a change in its refractive index. As a result, the positions of the interference waveforms shift and the intervals between the interference waveform peaks change after the temperature change relative to those before the temperature change. During this process, if the temperatures at the individual measurement points change, the positions of the interference waveforms at each measurement point shift, which alters the interval between the interference waveform peaks. By measuring the interval between the interference waveform peaks in correspondence to each measurement point, the change in the temperature having occurred at the measurement point can be detected. For instance, the intervals between the interference waveform peaks change in correspondence to the distance over which the reference beam reflecting means (e.g., a reference mirror) 140 moves in the temperature measuring apparatus 100 shown in FIG. 1, and thus, by measuring the distance over which the reference mirror is driven, indicating the interval between the interference waveform peaks, the change in temperature can be detected.

In the following specific explanation of the temperature measurement method, d represents the thickness of the temperature measurement target wafer T undergoing the measurement as shown in FIG. 3 and n represents its refractive index. As the reference mirror is scanned along the single direction while the first and second measurement beams are radiated onto the respective measurement points $P_1$ and $P_2$, the measurement beams are reflected from the front surface and the rear surface at the individual measurement points $P_1$ and $P_2$ of the wafer, and two interference waveforms attributable to the interference of the reflected first or second measurement beam and the reference beam are observed in correspondence to each of the measurement points $P_1$ and $P_2$, as shown in FIG. 3A.

As the wafer is heated with a heater or the like in this state, the wafer temperature rises and this change in the temperature causes the wafer to expand, resulting in a change in the refractive index. Thus, as shown in FIG. 3B, the peak position of one of the interference waveforms at each measurement point $P_1$ or $P_2$ shifts relative to the position of the other interference waveform corresponding to the same measurement point and the interval between the interference waveform peaks becomes altered. For instance, FIG. 3B indicates that the positions of the interference waveforms at the rear surface relative to the positions of the interference waveforms at the front surface of the wafer at the individual measurement points $P_1$ and $P_2$ become shifted respectively by $t_1$ and $t_2$ compared to the corresponding positions in FIG. 3A. Consequently, the intervals between the interference waveform peaks at the measurement points $P_1$ and $P_2$ change from $W_1$ and $W_2$ in FIG. 3A to $W_1'$ and $W_2'$ in FIG. 3B.

The extent to which the peak position of such an interference waveform shifts is dependent upon the coefficient of linear expansion α inherent to each layer along the depth d and the extent of change in the refractive index n is primarily dependent upon the temperature coefficient of refractive index change β inherent to each layer. It is to be noted that the temperature coefficient of refractive index change β is known to be also dependent upon the wavelength.

Accordingly, the thicknesses $d_1'$ and $d_2'$ of the wafer at the measurement points $P_1$ and $P_2$ after the temperature change are expressed as in (1-1) and (1-2) below. It is to be noted that in expressions (1-1) and (1-2) below, $\Delta T_1$ and $\Delta T_2$ respectively represent the temperature changes at the measurement points $P_1$ and $P_2$ and α and β respectively indicate the coefficients of linear expansion at the wafer and the temperature coefficient of refractive index change for the wafer. In addition, $d_1$ and $n_1$ respectively indicate the thickness and the refractive index at the measurement point $P_1$ and $d_2$ and $n_2$ respectively indicate the thickness and the refractive index at the measurement point $P_2$ prior to the temperature change. It is to be noted that since the wafer thickness d and the refractive index n in the initial state prior to the heat application to the wafer can be assumed to be consistent over the entire wafer surface at all the measurement points $P_1$ and $P_2$, $d=d_1=d_2$ and $n=n_1=n_2$ are true in the initial state.

$$d_1'=d_1 \cdot (1+\alpha \Delta T_1), \; n_1'=n_1 \cdot (1+\beta \Delta T_1) \tag{1-1}$$

$$d_2'=d_2 \cdot (1+\alpha \Delta T_2), \; n_2'=n_2 \cdot (1+\beta \Delta T_2) \tag{1-2}$$

As expressions (1-1) and (1-2) provided above indicate, the optical path lengths of the first and second measurement beams transmitted through the measurement points $P_1$ and $P_2$ respectively change as the temperature changes. An optical path length is normally indicated as the product of the thickness d and the refractive index n. Accordingly, with $L_1$ and $L_2$ respectively representing the optical path lengths of the first and second measurement beams transmitted through the measurement points $P_1$ and $P_2$ prior to the temperature change and $L_1'$ and $L_2'$ representing the optical path lengths after the temperatures at the measurement points $P_1$ and $P_2$ change by $\Delta T_1$ and $\Delta T_2$ respectively, $L_1$ and $L_1'$ can be expressed as in (1-3) below and $L_2$ and $L_2'$ can be expressed as in (1-4) below.

$$L_1 = d_1 \cdot n_1, \; L_1' = d_1' \cdot n_1' \tag{1-3}$$

$$L_2 = d_2 \cdot n_2, \; L_2' = d_2' \cdot n_2' \tag{1-4}$$

Accordingly, the differences $(L_1'-L_1)$ and $(L_2'-L_2)$ between the optical path lengths of the first measurement beam at the measurement point $P_1$ and between the optical path lengths of the second measurement beam at the measurement point $P_2$ prior to and following the temperature change can be expressed as in (1-5) and (1-6) below by incorporating and streamlining expressions (1-1), (1-2), (1-3) and (1-4) provided above. It is to be noted that expressions (1-5) and (1-6) do not include any infinitesimal terms in consideration of $\alpha \cdot \beta << \alpha$ and $\alpha \cdot \beta << \beta$. Since the wafer thickness d and the refractive index n in the initial state prior to the heat application to the wafer can be assumed to be consistent over the entire wafer surface at all the measurement points $P_1$ and $P_2$, $L=d \cdot n=L_1=L_2$ is true in the initial state.

$$L_1'-L_1=d_1' \cdot n_1'-d_1 \cdot n_1=d_1 \cdot n_1 \cdot (\alpha+\beta) \cdot \Delta T_1=L_1 \cdot (\alpha+\beta) \cdot \Delta T_1 \tag{1-5}$$

$$L_2'-L_2=d_2' \cdot n_2'-d_2 \cdot n_2=d_2 \cdot n_2 \cdot (\alpha+\beta) \cdot \Delta T_2=L_2 \cdot (\alpha+\beta) \cdot \Delta T_2 \tag{1-6}$$

The optical path length of the measurement beam at each measurement point is equivalent to the interval between the peaks in the waveforms of the interference of the measurement beam and the reference beam at the measurement point. For instance, the optical path lengths $L_1$ and $L_2$ of the first and second measurement beams at the individual measurement points $P_1$ and $P_2$ prior to the temperature change are respectively equivalent to the intervals $W_1$ and $W_2$ between the peaks of the interference waveforms shown in FIG. 3A, and the optical path lengths $L_1'$ and $L_2'$ of the first and second measurement beams at the measurement points $P_1$ and $P_2$ following the temperature change are respectively equivalent to the intervals $W_1'$ and $W_2'$ between the peaks of the interference waveforms shown in FIG. 3B. Thus, the interval between the peaks of the waveforms of the interference of the measurement beam and the reference beam at each measurement point can be measured in correspondence to the distance by which the reference beam reflecting means (e.g., a reference mirror) 140 is moved in the temperature measuring apparatus shown in FIG. 1.

Accordingly, as long as the coefficient of linear expansion $\alpha$ and the temperature coefficient of refractive index change $\beta$ of the wafer are ascertained in advance, the temperatures at the measurement points $P_1$ and $P_2$ can be calculated through conversion by using expressions (1-5) and (1-6), once the intervals between the peaks of the interference waveforms of the interference of the measurement beams and the reference beam at the individual measurement points are measured.

When converting an interference waveform peak interval to a temperature as described above, it is necessary to ascertain in advance the coefficient of linear expansion $\alpha$ and the temperature coefficient of refractive index change $\beta$ since the coefficient of linear expansion $\alpha$ and the temperature coefficient of refractive index change $\beta$ affect the optical path length indicated by the interval between the interference waveform peaks. Generally speaking, the coefficient of linear expansion $\alpha$ and the temperature coefficient of refractive index change $\beta$ of an object such as a wafer may be dependent upon the temperature in certain temperature ranges. For instance, since the coefficient of linear expansion $\alpha$ does not normally change significantly as long as the temperature of the substance is in the range of approximately 0 through 100° C., the coefficient of linear expansion may be regarded to be constant in this range. However, once the temperature exceeds 100° C., the coefficient's of linear expansion of some materials start to change by greater extents as the temperature becomes higher and, in such a case, the temperature dependency cannot be disregarded. Likewise, the temperature dependency of the temperature coefficient of refractive index change $\beta$ cannot be disregarded in a certain temperature range, either.

For instance, it is known that the coefficient of linear expansion $\alpha$ and the temperature coefficient of refractive index change $\beta$ of silicon (Si) used to constitute wafers can be approximated with quadratic curves in the temperature range of 0 through 500° C. Refer to, for instance, an article written by J. A. McCaulley, V. M. Donelly et al. (J. A. McCaulley, V. M. Donelly, M. Vernon and I. Taha, "Temperature dependence of near-infrared refractive index of silicon gallium, arsenide, and indium phosphide" Phy. Rev. B49, 7408, 1994) for details.

As described above, the coefficient of linear expansion $\alpha$ and the temperature coefficient of refractive index change $\beta$ are dependent on the temperature and accordingly, by ascertaining the values of the coefficient of linear expansion $\alpha$ and the temperature coefficient of refractive index change $\beta$ corresponding to specific temperatures in advance and using these values in the temperature conversion, the temperature can be calculated with an even higher level of accuracy.

(Example of Conversion from Interference Waves to Temperatures)

A specific example of conversion from interference waves to temperatures in temperature measurement of the temperature measurement target such as a wafer, achieved based upon the principal described above, is explained below. First, prior to the wafer temperature measurement, the values of the coefficient of linear expansion $\alpha$ and the temperature coefficient of refractive index change $\beta$ corresponding to the wafer are ascertained for a plurality of temperature ranges, and the values of the coefficient of linear expansion $\alpha$ and the temperature coefficient of refractive index change $\beta$ are stored in memory or the like as temperature conversion reference data in correspondence to the individual temperature ranges.

More specifically, such temperature conversion reference data may be obtained by radiating a measurement beam onto a given measurement point of a reference wafer while adjusting the wafer temperature and measuring the optical path lengths $L_m = d_m \cdot n_m$, i.e., the intervals between the interference waveform peaks, at temperatures $T_m (m=1, 2, \ldots)$ in a plurality of temperature ranges.

With the $L_m$ representing the optical path length of the measurement beam at the temperature $T_m$ and $L_{m+1}$ representing the optical path length of the measurement beam after the temperature changes to $T_{m+1}$, the optical path lengths $L_m$ and $L_{m+1}$ have a relationship expressed as in (1-7) below, similar to the relationships expressed in (1-5) and (1-6). The expression (1-7) can then be modified to expression (1-8).

$$L_{m+1} - L_m = d_{m+1} \cdot n_{m+1} - d_m \cdot n_m \qquad (1\text{-}7)$$
$$= d_m \cdot n_m \cdot (\alpha + \beta)_m \cdot (T_{m+1} - T_m)$$

$$(\alpha + \beta)_m = (d_{m+1} \cdot n_{m+1} - d_m \cdot n_m) / (d_m \cdot n_m \cdot (T_{m+1} - T_m)) \qquad (1\text{-}8)$$
$$= (L_{m+1} - L_m) / L_m \cdot (T_{m+1} - T_m)$$

Based upon the value of the optical path length $L_m (= d_m \cdot n_m)$ of the measurement beam at each temperature setting $T_m (m=1, 2, \ldots)$ thus measured, i.e., based upon the measurement value representing the interval between the interference waveform peaks at the temperature $T_m$ (m=1, 2, ...), the corresponding value for $(\alpha + \beta)_m$ can be calculated as expressed in (1-8). The pairs of values of $T_m$ and $(\alpha + \beta)_m$ thus obtained are stored into memory in advance as the temperature conversion reference data.

It is to be noted that if the coefficient of linear expansion $\alpha$ and the temperature coefficient of refractive index change $\beta$ can be approximated as quadratic functions in which the temperature is a variable as in the case of silicon mentioned earlier, the quadratic expression may be stored in memory and the coefficient of linear expansion $\alpha$ and the temperature coefficient of refractive index change $\beta$ may then be calculated as necessary by using the expressions stored in memory.

For the actual wafer temperature measurement, an optical path length initial value $L_f (= d_f \cdot n_f)$ corresponding to the wafer is measured based upon the interference waveforms of the interference of a measurement beam and the reference beam obtained by radiating the measurement beam onto a given measurement point and the initial value is stored into memory or the like, before the wafer processing starts. If a plurality of wafers are to be processed, the optical path length initial value $L_f (= d_f \cdot n_f)$ should be measured for each wafer, since the wafer thickness is not constant among individual wafers in reality and it is more desirable to measure the temperature of a given wafer accurately by calculating the temperature through conversion in correspondence to the thickness inherent to the wafer.

For this reason, the optical path length initial value $L_f$ must be measured for the wafer before the wafer temperature changes. Namely, since the temperature changes as the wafer is placed on the stage surface of the lower electrode (susceptor) within the processing chamber, for instance, the initial value must be measured at least before the wafer is placed on the lower electrode.

In more specific terms, if the optical path length initial value $L_f$ for each wafer is measured outside the substrate processing apparatus, for instance, a database of the measurement values corresponding to the individual wafers should be prepared and the measurement values in the database should be used as data for the temperature conversion. Alternatively, if the optical path length initial value $L_f$ for each wafer is measured within the substrate processing apparatus, the initial value should be measured while the wafer is present in the transfer chamber (which may be used as a load lock chamber), a measurement chamber or the like before it is transferred into the processing chamber to undergo the processing. If the wafer has already been transferred into the processing chamber, the initial value should be measured while the wafer is supported by the lifter pin projecting further upward beyond the stage surface of the lower electrode (susceptor) or while the descent of the lifter pin carrying the wafer is still in progress and the wafer is yet to be placed on the stage surface of the lower electrode (susceptor) within the processing chamber.

The temperature conversion should be executed as described below when measuring the temperatures of a wafer having been transferred into the processing chamber. The temperature $T_x$ at each measurement point is first detected by measuring the optical path length $L_x(=d_x \cdot n_x)$ based upon the interference waveforms obtained by irradiating the measurement point with a measurement beam and calculating the temperature $T_x$ of the wafer as explained below based upon the optical path length initial value $L_f(=d_f \cdot n_f)$ and $(\alpha+\beta)_f$ corresponding to the temperature $T_f$ indicated in the temperature conversion reference data. Namely, the wafer temperature $T_x$ is calculated as expressed in (1-10) similar to expression (1-8) provided earlier, which is obtained by modifying expression (1-9).

$$L_x - L_f = d_x \cdot n_x - d_f \cdot n_f \quad (1\text{-}9)$$
$$= d_f \cdot n_f \cdot (\alpha + \beta)_f \cdot (T_x - T_f)$$

$$T_x = (d_x \cdot n_x - d_f \cdot n_f)/d_f \cdot n_f \cdot (\alpha + \beta)_f + T_f \quad (1\text{-}10)$$
$$= L_x - L_f / L_f \cdot (\alpha + \beta)_f + T_f$$

In a subsequent measurement of the wafer temperature $T_x \equiv T_m'$, the current optical path length is measured and the measurement value is used to update $L_x=(d_x \cdot n_x)$. At this time, the current temperature $T_x$ to be measured is calculated by substituting the value $T_m'$ $(\alpha+\beta)_m$ measured in the temperature range containing $T_m'$ based upon the temperature conversion reference data for $(\alpha+\beta)_m'$ at the temperature $T_m'$. This process should be repeatedly executed to detect subsequent wafer temperatures $T_x$.

It is to be noted that since the temperature dependency of the coefficient of linear expansion $\alpha$ and the temperature coefficient of refractive index change $\beta$ can be disregarded over certain temperature ranges, as described earlier, the temperatures $T_x$ at the wafer can be calculated by invariably using a constant value for $(\alpha+\beta)_m$ in the temperature measurement executed in such a temperature range. Alternatively, the average of $(\alpha+\beta)_m$ within this temperature range may be used as $(\alpha+\beta)_m'$ for the calculation of all the temperatures $T_x$ of the wafer in the range.

It is to be noted that the temperatures may be measured based upon the interference waves induced by the measurement beams and the reference beam by adopting a method other than that described above. For instance, the temperatures may be measured in relation to a change in the absorption intensity resulting from a temperature change, or the temperatures may be measured in relation to the optical path length change and the absorption intensity change both resulting from a temperature change.

(Specific Example of Temperature Measurement System Adopting the Temperature Measuring Apparatus)

Figure 4:
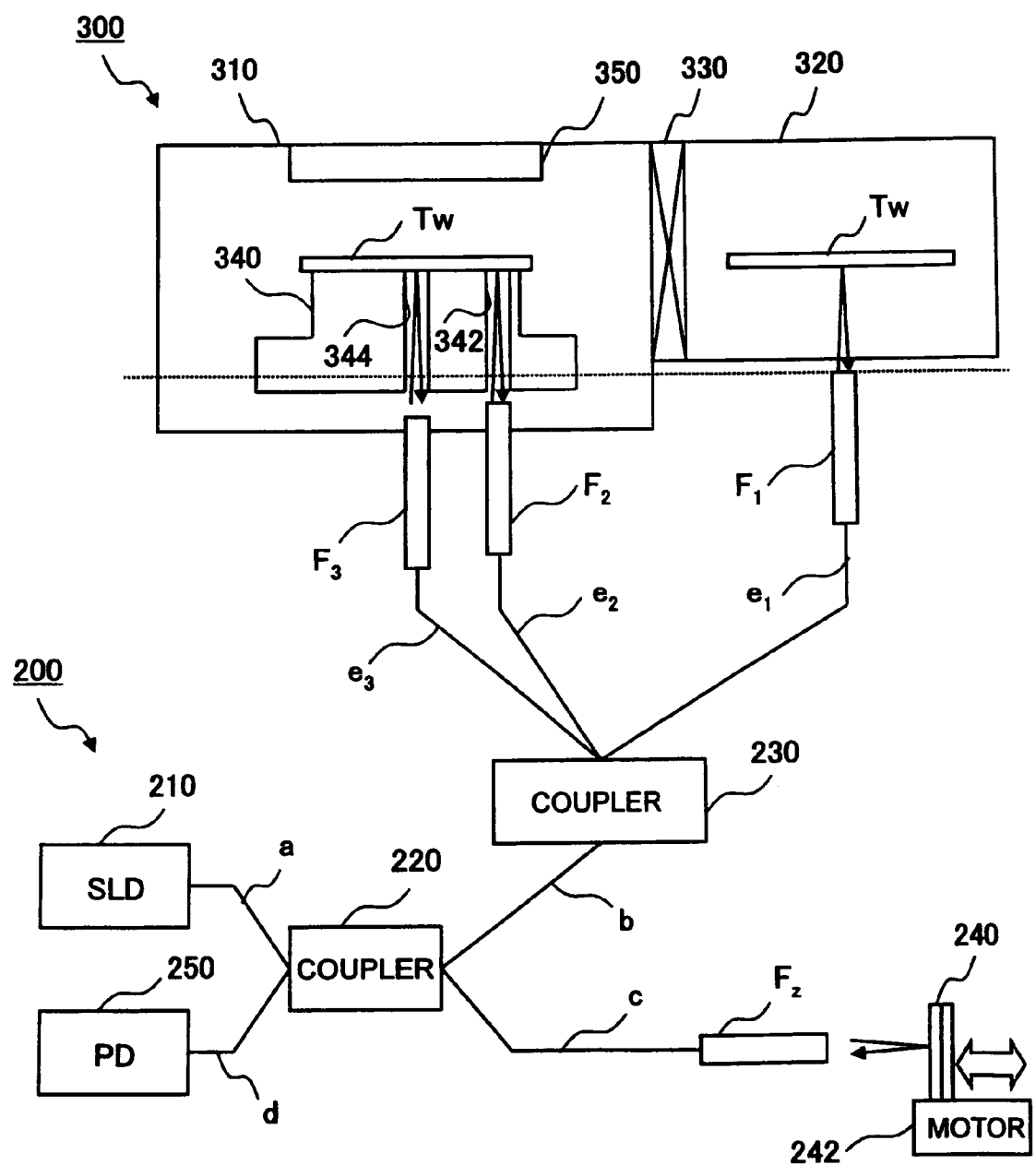
FIG. 4 shows a schematic structure representing a specific example of a substrate processing apparatus temperature measurement system achieved by adopting the temperature measuring apparatus in the embodiment.

Next, a specific example of a temperature measurement system for a substrate processing apparatus, achieved by adopting the temperature measuring apparatus in the embodiment, is explained in reference to a drawing. FIG. 4 schematically shows the structure of the temperature measurement system. In this example, the temperature measuring apparatus achieved in the embodiment is adopted in the measurement of the temperature of a work substrate such as a wafer Tw in a substrate processing apparatus which may be, for instance, an etching apparatus.

The temperature measurement system in FIG. 4 is primarily constituted with a temperature measuring apparatus 200 and a substrate processing apparatus 300. A light source of the temperature measuring apparatus 200 in FIG. 4, corresponding to the light source 110 in FIG. 1, is a low coherence light source constituted with a low coherence SLD 210. The first splitter 120 is constituted with, for instance, a 2×2 optical fiber coupler 220, the second splitter 130 is constituted with, for instance, a 1×3 optical fiber coupler 230, the light receiving means 150 is constituted with a PD 250 achieved by using, for instance, a Ge photodiode, the reference beam reflecting means 140 is constituted with, for instance, a reference mirror 240 and the drive means 142 is constituted with a stepping motor 242 which drives the reference mirror 240 in the temperature measuring apparatus 200 in FIG. 4.

The reference beam from the optical fiber coupler 220 is transmitted to the reference beam irradiating position at which it is radiated onto the reference mirror 240 via the reflected light transmitting means constituted with, for instance, a collimate fiber $F_z$, whereas first through third measurement beams from the optical fiber coupler 230 are respectively transmitted to measurement beam irradiating positions at which they are radiated onto the wafer Tw, i.e., the temperature measurement target T, via, for instance, collimate fibers $F_1$ through $F_3$ constituting the first through third measurement beam transmitting means.

As shown in FIG. 4, the substrate processing apparatus 300 includes a processing chamber 310 where a specific type of processing such as etching or film formation is executed on the wafer Tw. A transfer chamber 320 through which the wafer Tw is transferred into/out of the processing chamber 310 is connected to the processing chamber 310 via a gate valve 330. Inside the processing chamber 310, an upper electrode 350 is disposed, with a lower electrode 340 disposed so as to face opposite the upper electrode 350. Predetermined levels of high-frequency power can be applied to the upper electrode 350 and the lower electrode 340. Above the lower electrode 340, an electrostatic chuck (not shown) which electrostatically holds the wafer Tw is disposed. Numerous holes are formed at the upper electrode 350 so as to uniformly guide, for instance, a processing gas into the space above the wafer surface. High-frequency power at the predetermined levels is applied to the upper electrode 350 and the lower electrode 340.

In the substrate processing apparatus 300, the wafer Tw is transferred from an external wafer cassette into the transfer chamber 320 on a transfer arm or the like and then waits in standby in the transfer chamber 320. As the processing on the preceding wafer Tw ends and preparation for the next wafer processing is completed, the gate valve 330 is released to allow the wafer Tw to be transferred from the transfer chamber 320 to the processing chamber 310. Namely, the processed wafer Tw is replaced with the next wafer Tw in standby on a transfer arm or the like adopting a two-stage structure (not shown). The wafer Tw having been transferred into the processing chamber 310 is placed on the lower electrode 340 onto which the wafer Tw becomes electrostatically held. Then, the high-frequency power is applied to the upper electrode 350 and the lower electrode 340 and concurrently, a specific type of processing gas is supplied into the processing chamber 310 via the upper electrode 350. Consequently, the processing gas supplied via the upper electrode 350 is raised to plasma to be used to, for instance, etch the surface of the wafer Tw.

The collimate fibers $F_1$ through $F_3$ that transmit the first through third measurement beams are disposed inside the transfer chamber 320 and the processing chamber 310 at the substrate processing apparatus 300. More specifically, the collimate fiber $F_1$ is disposed at a measurement beam irradiating position at which the first measurement beam is to be radiated onto a wafer Tw waiting in standby in the transfer chamber 320. The collimate fiber $F_1$ should be disposed by ensuring that the first measurement beam is radiated onto a first measurement point at, for instance, the center of the wafer Tw. It is to be noted that the measurement point does not need to be at the exact center of the wafer and that more than one measurement point may be set.

The collimate fibers $F_2$ and $F_3$ are respectively disposed at measurement beam irradiating positions at which the second and third measurement beams are to irradiate a wafer Tw placed on the lower electrode 340 via through holes 342 and 344 formed at the lower electrode 340. For instance, the collimate fiber $F_2$ may be disposed so as to irradiate a second measurement point at the edge of the wafer Tw with the second measurement beam and the collimate fiber $F_3$ may be disposed so as to irradiate a third measurement point at the center of the wafer Tw with the third measurement beam. It is to be noted that the positions of the measurement points do not need to be at the center and the edge of the wafer and that the number of measurement points does not need to be 2, either.

In addition, the collimate fibers $F_1$ through $F_3$ are disposed so as to vary the optical path lengths of the first through third measurement beams extending from the optical fiber coupler 230 to the wafers Tw by, for instance, offsetting the front end surfaces of the collimate fibers $F_1$ through $F_3$ relative to the wafers Tw, i.e., the temperature measurement target T by varying degrees. Since this allows the interference waves induced by the first through third measurement beams and the reference beam at the wafers Tw in the transfer chamber 320 and in the processing chamber 310 to be detected simply by scanning the reference mirror 240 once, the temperature measurement for the wafer Tw in the transfer chamber 320 can be executed concurrently during the temperature measurement for the wafer Tw present inside the processing chamber 310.

Furthermore, since a measurement beam can be radiated onto the wafer Tw waiting in standby in the transfer chamber 320 as well as the wafer Tw present in the processing chamber 310 in the temperature measurement system shown in FIG. 4, the measurement value indicating the optical path length of the first measurement beam (the interval between the interference waveform peaks) measured at the wafer Tw waiting in standby in the transfer chamber 320 before undergoing the processing can be used as the optical thickness initial value inherent to the wafer Tw, i.e., the optical length initial value $L_f(=d_f n_f)$ of the wafer Tw.

For instance, the optical path length of the first measurement beam measured at the first measurement point while the unprocessed wafer Tw waits in standby in the transfer chamber 320 before being transferred into the processing chamber 310 may be stored into a memory or the like as the optical path length initial value $L_f$ for the particular wafer Tw. Subsequently, the optical path length initial value $L_f$ of the wafer Tw may be used when measuring the temperatures at the second and third measurement points based upon the optical path lengths of the second and third measurement beams measured at the second and third measurement points after the wafer Tw is transferred from the transfer chamber 320 into the processing chamber 310.

By using such an initial value that allows the temperatures at the individual measurement points to be calculated through conversion from the corresponding optical path lengths based upon the thickness of the particular wafer instead of, for instance, an initial value representing a standard optical path length at wafers, even more accurate wafer temperature measurement is enabled when the wafer thickness is not consistent among individual wafers.

In particular, by employing a temperature measurement system such as that shown in FIG. 4 and continuously processing a plurality of wafers Tw, the measurement at the second and third measurement points of the wafer Tw in the processing chamber 310 and the measurement at the first measurement point of another wafer Tw waiting in standby in the transfer chamber 320 can be executed at once. In such an application, the results of the measurement on the other wafer Tw waiting in standby in the transfer chamber 320 may be stored into memory or the like as the optical path length initial value for the wafer Tw, and the initial value thus stored in memory may be used when calculating the temperatures at the second and third measurement points through conversion after the wafer Tw is transferred into the processing chamber 310.

As described above, since the optical path lengths initial value of the next wafer Tw to be processed can be measured concurrently while measuring the temperatures of the wafer Tw currently in the processing chamber, higher efficiency in the temperature measurement is achieved and the length of time required for the measurement can be reduced compared to a system in which the optical path lengths initial value for each wafer Tw needs to be separately measured in advance.

(Specific Example of a Control System Adopting the Temperature Measuring Apparatus)

Figure 5:
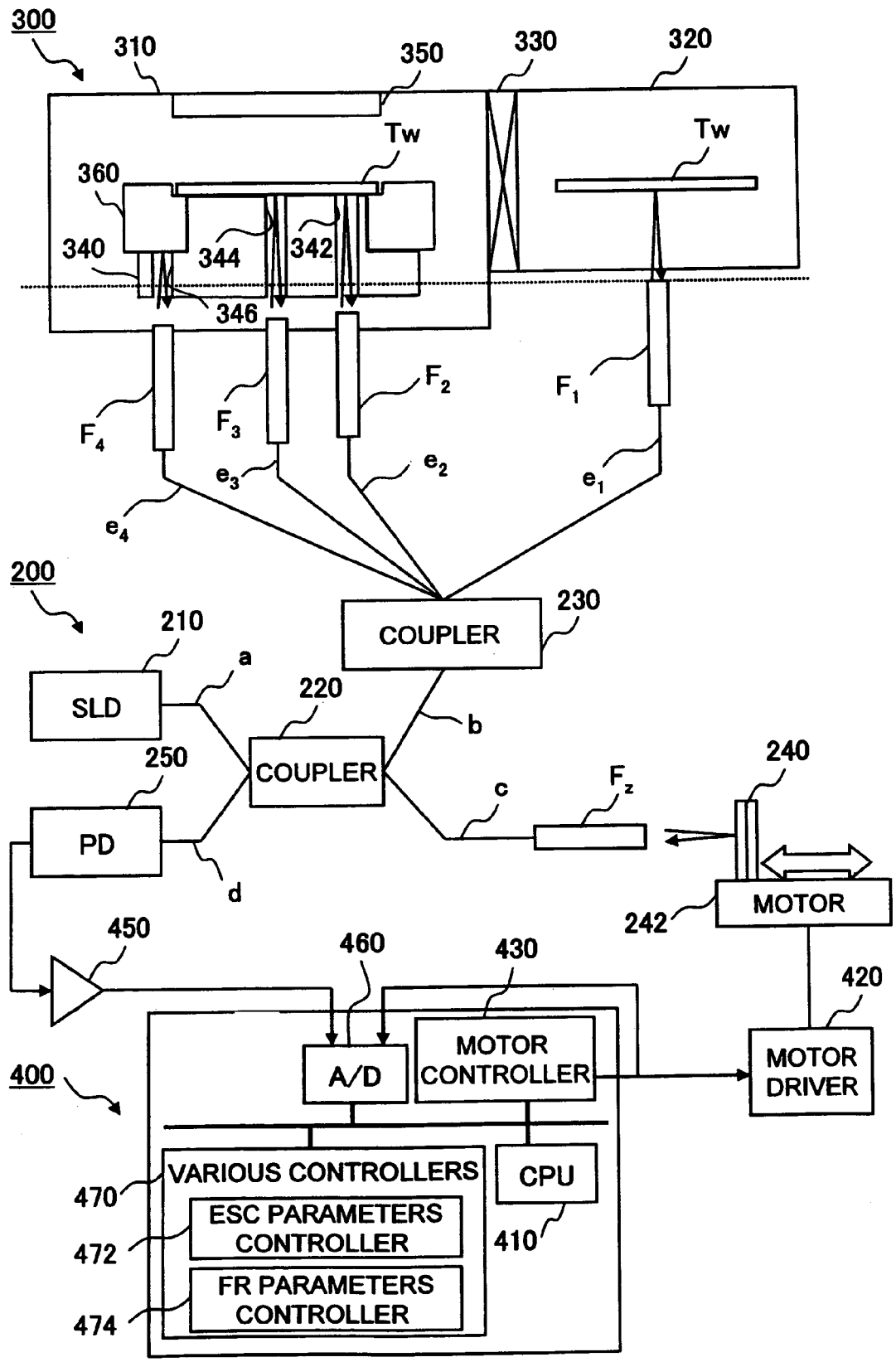
FIG. 5 shows a schematic structure representing a specific example of a substrate processing apparatus control system achieved by adopting the temperature measuring apparatus in the embodiment.

Next, a specific example of a control system for a substrate processing apparatus, achieved by adopting the temperature measuring apparatus according to the present invention, is explained in reference to a drawing. FIG. 5 schematically shows the structure of the control system for a substrate processing apparatus.

The control system in FIG. 5 is primarily constituted with a temperature measuring apparatus 200, a substrate processing apparatus 300 and a control device 400. The structure of the temperature measuring apparatus 200 in FIG. 5 is substantially similar to the structure of the temperature measuring apparatus in FIG. 4. An optical fiber 230 in FIG. 5 differs from that in FIG. 4 in that it splits the temperature measurement beam from the optical fiber coupler 220 into the first measurement beam, the second measurement beam, the third measurement beam and a fourth measurement beam used to measure the temperature at a focus ring (FR) 360 inside the processing chamber 310. The fourth measurement beam from the optical fiber coupler 220 is transmitted to a measurement beam irradiating position at which it radiated onto the temperature measurement target T, i.e., the focus ring 360, via a fourth measurement beam transmitting means constituted with, for instance, a collimate fiber $F_4$.

The collimate fibers $F_1$ to $F_3$ and the collimate fiber $F_4$ are disposed so as to vary the individual optical path lengths of the first through third measurement beams extending from the optical fiber coupler 230 to the wafers Tw undergoing the temperature measurement and the optical path length of the fourth measurement beam extending from the optical fiber coupler 230 to the temperature measurement target T, i.e., the focus ring 360, from one another by, for instance, offsetting the front end surfaces of the collimate fibers $F_1$ through $F_4$ from the corresponding temperature measurement targets by varying degrees. Since this allows the interference waves induced by the first through fourth measurement beams and the reference beam at the wafers Tw in the transfer chamber 320 and the processing chamber 310 and at the focus ring 360 to be detected simply by scanning the reference mirror 240 once, the temperatures at the first through fourth measurement points can be measured all at once.

The structure of the substrate processing apparatus 300 in FIG. 5 is substantially similar to the structure of the substrate processing apparatus in FIG. 4. The focus ring 360 is disposed so as to surround the wafer Tw at the lower electrode 340 inside the processing chamber 310 in FIG. 5. The temperature at the focus ring 360 may be controlled by applying a voltage to an electrode built into the focus ring 360. In addition, a gas passage may be formed at the focus ring 360 to supply a backside gas, (e.g., He or $N_2$) toward the rear surface at the edge of the wafer Tw via the gas passage.

A through hole 346 is formed under the focus ring 360 at the lower electrode 340 in FIG. 5 so as to enable the measurement of the temperature at the focus ring 360. The collimate fiber $F_4$ is disposed at a measurement beam irradiating position at which the fourth measurement beam from the temperature measuring apparatus 200 is to be radiated onto the focus ring 360 via the through hole 346.

Above the lower electrode 340, an electrostatic chuck for electrostatically holding the wafer Tw is disposed. An electrode plate is built into the electrostatic chuck, and a voltage can be applied to the electrode plate. In addition, a gas passage through which a backside gas (e.g., He, $N_2$) is supplied toward the rear surface of the wafer Tw is formed both at the center and at the edge of the electrostatic chuck. Within the lower electrode 340, a coolant passage through which a coolant is circulated to control the temperature of the lower electrode 340 is formed. It is to be noted that in order to show the structure relevant to the temperature measurement in a simplified manner, FIG. 5 does not include illustrations of the electrostatic chuck, the coolant passage, the backside gas passages and the like.

The control device 400 includes a CPU (central processing unit) 410 constituting the main unit of the control device, a motor controller 430 that controls the stepping motor 242 for driving the reference mirror 240 via a motor driver 420, an A/D convertor 460 that executes analog/digital conversion of output signals (indicating the results of interference wave measurement obtained by radiating measurement beams) input thereto from the PD 250 via a buffer 450 and a control signal (e.g., a drive pulse) provided by the motor controller 430 and inputs the results of the conversion, various controllers 470 that control the individual units constituting the substrate processing apparatus 300 and the like, and memory (not shown). The control device 400 may measure the position to which the reference mirror 240 is moved or the distance by which the reference mirror 240 is moved based upon the control signal (e.g., a drive pulse) for the stepping motor 242 output from the motor controller 430, or it may measure the position to which the reference mirror 240 is moved or the distance by which the reference mirror 240 is moved based upon an output signal provided by a linear encoder mounted at the motor 242. In addition, the motor 242 does not need to be a stepping motor and instead, a voice coil motor or the like may be used as the motor 242.

The various controllers 470 may include, for instance, an ESC (electrostatic chuck) parameter controller 472 and an FR (focus ring) parameter controller 474. The ESC parameter controller 472 controls the voltage applied to the electrostatic chuck (ESC), the gas flow rate and the gas pressure of the backside gas supplied to the wafer Tw via the electrostatic chuck, the temperature of the coolant circulating in the coolant passage formed inside the lower electrode 340 and the like.

The FR parameter controller 474 controls the voltage applied to the focus ring 360, the gas flow rate and the gas pressure of the backside gas supplied to the wafer Tw via the focus ring 360 and the like.

The operation executed by the control system shown in FIG. 5 is now explained. The control device 400 is able to control the temperature of the wafer Tw within its surface by controlling various components of the substrate processing apparatus 300 based upon the results of the temperature measurement concurrently executed by the temperature measuring apparatus 200 at the focus ring 360 and a plurality of measurement points within the surface of the wafer Tw.

For instance, the temperatures at the wafer Tw may be measured with the control device 400 monitoring the control signal (e.g., a drive pulse) output by the motor controller 430 and controlling the drive of the stepping motor 242 through feedback control to drive the reference mirror 240. As a result, the first through fourth measurement beams are radiated onto the individual measurement points at the wafers Tw and the focus ring 360, and the output from the PD 250 indicating the results of the measurement of the interference waves induced by the reflected measurement beams and the reflected reference beam is input to the control device 400 via the A/D convertor 460.

In response, the control device 400 stores into a storage means such as a memory the position to which the reference mirror 240 is moved at the peaks of the interference waveforms of the interference induced by each measurement beam and the reference beam based upon the control signal (drive pulse) for the stepping motor 242 which drives the reference mirror 240, and measures the interval between the peaks of the interference waveforms corresponding to each measurement beam, i.e., the optical path length of the measurement beam, as the distance to which the reference mirror 240 has been moved. Based upon the measurement values indicating the intervals between the peaks of the interference waveforms corresponding to the individual measurement beams, the temperature at each measurement point that may be located at a wafer Tw or the focus ring 360, can be calculated.

The control device controls the temperature of the wafer Tw by controlling with the ESC parameter controller 472 the voltage to be applied to the electrostatic chuck and the like or controls the processing at the edge of the wafer Tw by controlling with the FR parameter controller 474 the voltage or the like to be applied to the focus ring 360, based upon the results of the temperature measurement at the wafer Tw and the focus ring 360 executed as described above. Consequently, optimal temperature control can be achieved for the wafer Tw.

In particular, control parameters including the voltage to be applied to the electrostatic chuck, the gas flow rate and the gas pressure of the backside gas to be supplied to the wafer Tw via the lower electrode 340, the temperature of the coolant to circulate inside the lower electrode 340 and the like, which are controlled by the ESC parameter controller 472 as described earlier and control parameters including the voltage to be applied to the focus ring 360 and the flow rate and pressure of the backside gas to be supplied to the wafer Tw via the focus ring 360 which are controlled by the FR parameter controller 474 directly affect the surface temperature at the wafer Tw. Furthermore, the temperature measuring apparatus 200 according to the present invention in FIG. 4 enables non-contact direct measurement of the surface temperature at the wafer Tw. Thus, the surface temperature at the wafer Tw can be controlled so as to achieve uniformity in correspondence to the specific type of processing being executed by controlling the control parameters described above, or control may be executed so as to vary the temperature at the center and at the edge of the wafer Tw, through precise and accurate control of the surface temperature of the wafer Tw.

As described above, the control system shown in FIG. 5 adopting a simple structure, in which the focus ring 360, too, is irradiated by transmitting the fourth measurement beam via the collimate fiber $F_4$, makes it possible to measure the temperature at another temperature measurement target T, i.e., the focus ring 360, as well as the temperatures at the wafers Toward, all at once, thereby minimizing the labor and the length of time required for the temperature measurement.

It is to be noted that while an explanation is given above in reference to the control system in FIG. 5 on an example in which the temperature at another temperature measurement target T such as the focus ring 360 is measured as well as the temperatures at wafers Tw by the temperature measuring apparatus according to the present invention, the present invention may instead be adopted to measure the temperature at a component other than the focus ring 360 in addition to the temperatures at wafers Tw. For instance, it may be adopted in the measurement of the temperature at the upper electrode, as detailed later.

(Another Specific Example of the Control System Adopting the Temperature Measuring Apparatus)

Figure 6:
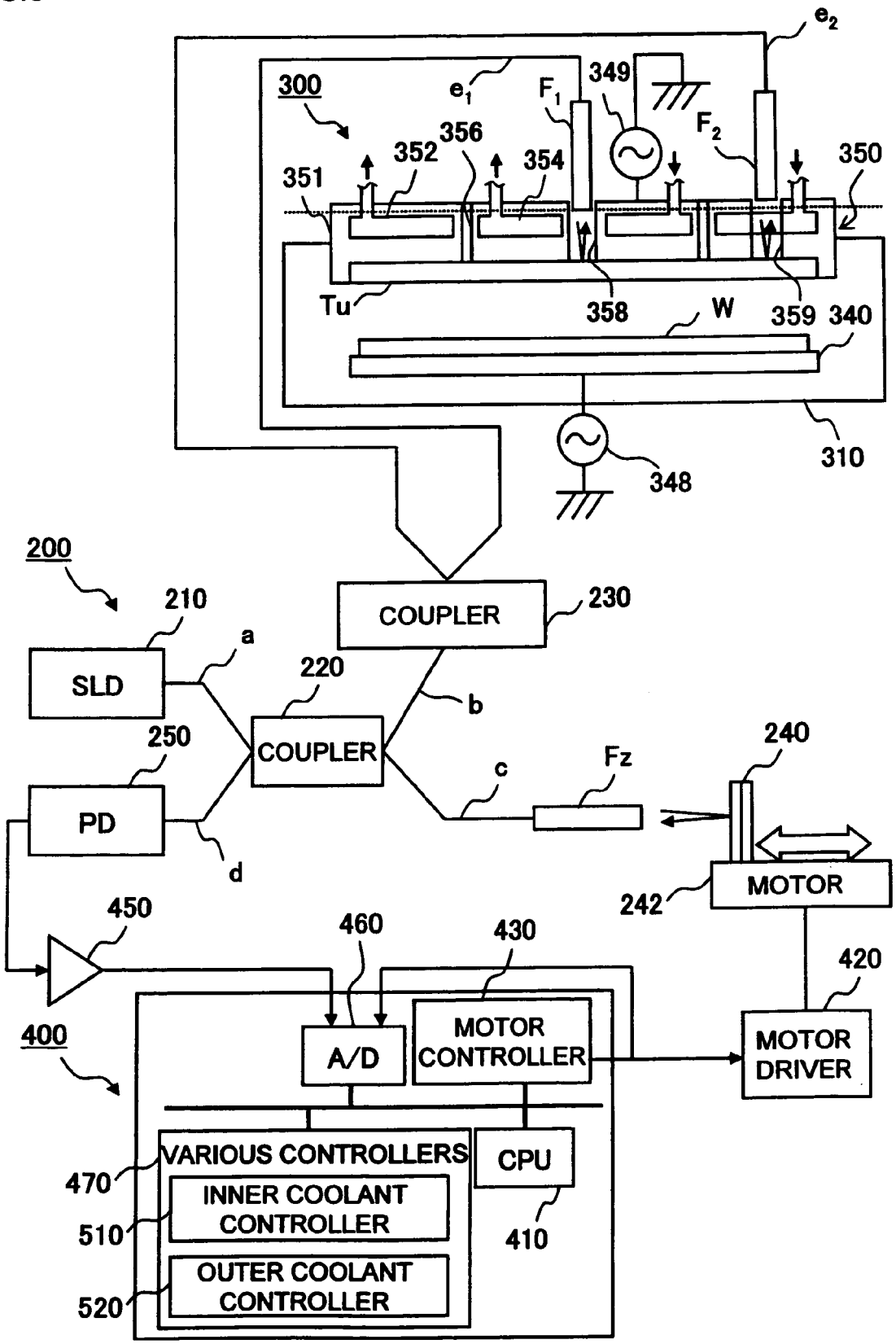
FIG. 6 shows another schematic structure representing a specific example of a substrate processing apparatus control system achieved by adopting the temperature measuring apparatus in the embodiment.

Next, another specific example of a control system for a substrate processing apparatus, achieved by adopting the temperature measuring apparatus according to the present invention, is explained in reference to a drawing. FIG. 6 schematically shows the structure of the other specific example of a control system for a substrate processing apparatus. This control system enables measurement of the temperature at a different temperature measurement target T, i.e., the upper electrode disposed inside the processing chamber. Accordingly, FIG. 6 shows the structure of the upper electrode 350 in detail and provides simplified illustrations of the structures adopted at the transfer chamber 320, the lower electrode 340 inside the processing chamber 310 and the like.

The control system in FIG. 6 is primarily constituted with a temperature measuring apparatus 200, a substrate processing apparatus 300 and the control device 400. The temperature measuring apparatus 200 and a control device 300 in FIG. 6 are substantially similar to those shown in FIG. 5. Inside the processing chamber 310 of the substrate processing apparatus 300 shown in FIG. 6, the upper electrode 350 and the lower electrode 340 are disposed so as to face opposite each other. High frequency power sources 348 and 349 are connected respectively to the lower electrode 340 and the upper electrode 350 to apply predetermined levels of high frequency power to them. Above the upper electrode 350, a supply pipe (not shown) through which a specific type of processing gas is supplied is disposed. Numerous outlet holes (not shown) are formed at an electrode plate Tu to allow the processing gas supplied through the supply pipe to be let out uniformly toward the wafer Tw placed on the lower electrode 340.

The electrode plate Tu of the upper electrode 350, which is a temperature measurement target T located at the lowermost position of the upper electrode 350, is supported with an electrode support member 351. The electrode plate Tu may be constituted of, for instance, a silicon material, whereas the electrode support member 351 may be constituted of, for instance, an aluminum material.

A cooling means is disposed at the upper electrode 350. The cooling means may be provided as a coolant passage formed inside the electrode support member 351 at the upper electrode 350, and the temperature of the upper electrode 350 is controlled by circulating a coolant through the coolant passage. Such a coolant passage should be formed in a substantially circular shape. There may be two coolant passage systems, e.g., an outer coolant passage 352 through which the coolant is circulated to cool the outside area of the surface of the upper electrode 350 and an inner coolant passage 354 through which the coolant is circulated to cool the inside area of the surface. The coolant is supplied through a supply pipe into the outer coolant passage 352 and the inner coolant passage 354, as indicated by the arrows in FIG. 6. The coolant having circulated through the individual coolant passages 352 and 354 is then discharged through a discharge pipe and the coolant is then allowed to return to an external refrigeration unit (not shown) for recirculation. A single type of coolant may be used to circulate through these two coolant passage systems, or two different types of coolant may be used for the circulation through the individual coolant passages. It is to be noted that the cooling means provided at the upper electrode 350 is not limited to the two coolant passage systems shown in FIG. 6. For instance, it may be achieved as a single coolant passage system, or it may be achieved as a single coolant passage system which splits into two passage branches.

At the electrode support member 351, a low heat transfer layer 355 is disposed between the outer area over which the outer coolant passage 352 is formed and the inner area over which the inner coolant passage 354 is formed. Since the low heat transfer layer 356 inhibits heat transfer between the outer area and the inner area at the electrode support member 351, it is possible to vary the temperature at the outer area from the temperature at the inner area through coolant control at the outer coolant passage 352 and the inner coolant passage 354. Thus, the temperature within the surface of the upper electrode 350 can be controlled efficiently and accurately.

At the upper electrode 350, collimate fibers $F_1$ and $F_2$ are disposed to transmit the first and second measurement beams from the optical fiber coupler 230 of the temperature measuring apparatus 200. More specifically, the collimate fibers $F_1$ and $F_2$ are respectively disposed so as to irradiate first and second measurement points at the electrode plate Tu with the first and second measurement beams via through holes 358 and 359 formed at the center and the edge of the electrode support member 351 at the upper electrode 350.

In addition, the collimate fibers $F_1$ and $F_2$ are disposed so as to vary the optical path lengths of the first and second measurement beams extending from the optical fiber coupler 230 to the temperature measurement target T, i.e. the electrode plate Tu of the upper electrode 350, from each other by, for instance, offsetting the front end surfaces of the collimate fibers $F_1$ and $F_2$ relative to the temperature measurement target by varying degrees. Since the structure allows the interference waves induced by the first and second measurement beams and the reference beam at the electrode plate Tu of the upper electrode 350 to be detected through a single scan of the reference mirror 240, the temperatures at the first and second measurement points can be measured all at once.

The control device 400 in FIG. 6 includes various controllers 470 such as an inner coolant controller 510 and an outer coolant controller 520. The inner coolant controller 510 controls the temperature in the inner area of the upper electrode 350 by controlling the temperature and the flow rate of the coolant circulating the inner coolant passage 354. The outer coolant controller 520 controls the temperature in the outer area of the upper electrode 350 by controlling the temperature and the flow rate of the coolant circulating the outer coolant passage 352.

Now, the operation executed by the control system in FIG. 6 is explained. The control device 400 is capable of controlling with precision and accuracy the temperatures at a given component constituting part of the substrate processing apparatus 300. More specifically, the temperature at the upper electrode 350 is controlled based upon the results of the temperature measurement concurrently executed at a plurality of measurement points within the surface of the electrode plate Tu of the upper electrode 350 by the temperature measuring apparatus 200. Since the temperature at the upper electrode 350 can be controlled as a whole or the temperatures at the center and at the edge of the upper electrode 350 can be controlled independently of each other, accurate control of the process characteristics is achieved within the surface of the wafer Tw and the stability of the substrate processing apparatus 300 is improved.

As described above, according to the present invention adopting a simple structure that includes a second splitter such as an optical fiber coupler used to split the temperature measurement beam from the light source into the required number of measurement beams and a measurement beam transmitting means for transmitting the individual measurement beams such as collimate fibers disposed so as to vary the optical path lengths of the measurement beams with respect to one another, the temperatures at a plurality of measurement points can be measured all at once. As a result, the number of measurement points can be increased with ease and the labor and the length of time required for the temperature measurement can be minimized while keeping costs at a minimum.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A temperature measuring apparatus comprising:
   a light source;
   a first splitter that splits light originating from said light source into a temperature measurement beam and a reference beam;
   a second splitter that further splits said temperature measurement beam from said first splitter into first through nth measurement beams;
   a reference beam reflecting means for reflecting said reference beam from the first splitter;
   an optical path length altering means for altering the optical path length of said reference beam reflected at said reference beam reflecting means by moving said reference beam reflecting means;
   a reflected light transmitting means for transmitting said reference beam from said first splitter to a reference beam irradiating position at which said reference beam is radiated onto said reference beam reflecting means;
   first through nth measurement beam transmitting means for transmitting said first through nth measurement beams from said second splitter to measurement beam irradiating positions at which said first through nth measurement beams are radiated onto various measurement points at a temperature measurement target; and
   a light receiving means for measuring interference of said first through nth measurement beams reflected from said temperature measurement target with said reference beam reflected from said reference beam reflecting means as said beam reflecting means is moved,
   wherein the lengths of optical paths of said first through nth measurement beams extending from said second splitter to said temperature measurement target are each offset by an extent at least equal to the coherence length of interference waves detected at said light receiving means such that the individual interference waves do not overlap.

2. A temperature measuring apparatus according to claim 1, wherein:
   the intensity ratio of said temperature measurement beam and said reference beam obtained by splitting said light from said light source at said first splitter is n:1; and
   the intensity levels of said first through nth measurement beams obtained by splitting said measurement beam at said second splitter are each 1/n of the intensity of said temperature measurement beam.

3. A temperature measuring apparatus according to claim 1, further comprising:
   a shutter means capable of turning on/off the radiation of said first through nth measurement beams onto said temperature measurement target, which is disposed between the individual measurement beam irradiating positions at which said first through nth measurement beams are radiated and said temperature measurement target.

4. A temperature measuring apparatus according to claim 1, wherein:
   said temperature measurement target is a work substrate processed by a substrate processing apparatus; and
   said first through nth measurement beam transmitting means are disposed at said substrate processing apparatus so as to radiate said first through nth measurement beams onto a plurality of measurement points within the surface of said work substrate.

5. A temperature measuring apparatus according to claim 4, wherein:
   said substrate processing apparatus includes a processing chamber in which a specific type of processing is executed on said work substrate and a transfer chamber connected to said processing chamber, through which said work substrate is transferred into/out of said processing chamber; and at least one of said first through nth measurement beam transmitting means is disposed at said transfer chamber so as to irradiate said work substrate present in said transfer chamber with a measurement beam.

6. A temperature measuring apparatus according to claim 5, wherein:
said temperature measurement target includes a focus ring disposed around said work substrate as well as said work substrate processed by said substrate processing apparatus; and
at least one of said first through nth measurement beam transmitting means is disposed so as to irradiate said focus ring with a measurement beam.

7. A temperature measuring apparatus according to claim 1, wherein:
said temperature measurement target is an upper electrode disposed inside said processing chamber of said substrate processing apparatus; and
at least one of said first through nth measurement beam transmitting means is disposed so as to irradiate said upper electrode with a measurement beam.

8. A temperature measurement method, comprising:
splitting light originating from a light source into a temperature measurement beam and a reference beam;
further splitting, via a splitter, the temperature measurement beam into first through nth measurement beams with optical paths different from one another;
a step in which the first through nth measurement beams with optical path lengths thereof different from one another are each radiated onto one of various measurement points at a temperature measurement target and the reference beam is radiated onto a reference beam reflecting means;
a step in which interference between said first through nth measurement beams reflected from said temperature measurement target and said reference beam reflected from said reference beam reflecting means is measured while altering the optical path length of said reference beam reflected from said reference beam reflecting means by moving said reference beam reflecting means along a single direction; and
a step in which temperatures at the various measurement points at said temperature measurement target are measured based upon the results of the interference measurement,
wherein the lengths of the optical paths of said first through nth measurement beams, extending to said temperature measurement target, are each offset by an extent at least equal to the coherence length of interference waves detected at said light receiving means such that the individual interference waves do not overlap.

9. A temperature measurement method according to claim 8, wherein:
the intensity ratio of light obtained by combining said first through nth measurement beams and said reference beam is n:1; and
the intensity levels of said first through nth measurement beams obtained by combining said first through nth measurement beams and said reference beam is 1/n of the intensity of said measurement beam.

10. A temperature measurement method according to claim 8, wherein:
by turning on/off with a shutter means radiation of a measurement beam to be reflected and used for measurement among said first through nth measurement beams, interference of the reflected measurement beam and the reflected reference beam is specified.

11. A temperature measurement method according to claim 8, wherein:
in said step in which the temperatures at said temperature measure target are measured based upon the results of the interference measurement, the temperatures at said temperature measurement target are calculated based upon, at least, measurement results obtained by measuring the optical path lengths of said through nth measurement beams in correspondence to interference waves and the optical path length initial value inherent to said temperature measurement target.

12. A temperature measurement method according to claim 8, wherein:
said temperature measurement target is a work substrate processed by a substrate processing apparatus; and
said first through nth measurement beams are each radiated onto one of a plurality of measurement points within a surface of said work substrate.

13. A temperature measurement method according to claim 12, wherein:
said substrate processing apparatus comprises a processing chamber in which a specific type of processing is executed on said work substrate and a transfer chamber connected to said processing chamber, through which said work substrate is transferred into/out of said processing chamber; and
at least one of said first through nth measurement beams is radiated onto said work substrate in said transfer chamber.

14. A temperature measurement method according to claim 13, wherein:
said temperature measurement target includes a focus ring disposed around said work substrate as well as said work substrate processed by said substrate processing apparatus; and
at least one of said first through nth measurement beams is radiated onto said focus ring.

15. A temperature measurement method according to claim 8, wherein:
said temperature measurement target is an upper electrode disposed inside said processing chamber of said substrate processing apparatus; and
at least one of said first through nth measurement beams is radiated onto said upper electrode.

16. A temperature measurement system, comprising:
a substrate processing apparatus; and
a temperature measuring apparatus, wherein
said substrate processing apparatus includes a processing chamber in which a specific type of processing is executed on a work substrate; and
said temperature measuring apparatus includes
a light source,
a first splitter that splits light originating from said light source into a temperature measurement beam and a reference beam,
a second splitter that further splits said temperature measurement beam from said first splitter into first through nth measurement beams,
a reference beam reflecting means for reflecting said reference beam from the first splitter,
an optical path length altering means for altering the optical path length of said reference beam reflected at said reference beam reflecting means by moving said reference beam reflecting means, a reflected light transmitting means for transmitting said reference beam from said first splitter to a reference beam irradiating position at which said reference beam is radiated onto said reference beam reflecting means, first through nth measurement beam transmitting means for transmitting said first through nth measurement beams from said second splitter to specific measurement beam irradiating positions at which said first through nth measurement beams are radiated onto the various measurement points at said work substrate, and light receiving means for measuring interference of said first through nth measurement beams reflected from said work substrate with said reference beam reflected from said reference beam reflecting means as said reference beam reflecting means is moved, wherein the optical path lengths of said first through nth measurement beams traveling from said second splitter to said work substrate are each offset by an extent at least equal to the coherence length of interference waves detected at said light receiving means such that the individual interference waves do not overlap.

17. A control system comprising:

a substrate processing apparatus;

a temperature measuring apparatus; and a control device, wherein said substrate processing apparatus includes a processing chamber in which a specific type of processing is executed on said work substrate; and said temperature measuring apparatus includes a light source, a first splitter that splits light originating from said light source into a temperature measurement beam and a reference beam, a second splitter that further splits said temperature measurement beam from said first splitter into first through nth measurement beams, a reference beam reflecting means for reflecting said reference beam from the first splitter, an optical path length altering means for altering the optical path length of said reference beam reflected at said reference beam reflecting means by moving said reference beam reflecting means, a reflected light transmitting means for transmitting said reference beam from said first splitter to a reference beam irradiating position at which said reference beam is radiated onto said reference beam reflecting means, first through nth measurement beam transmitting means for transmitting said first through nth measurement beams from said second splitter to measurement beam irradiating positions at which said first through nth measurement beams are radiated onto the various measurement points at said work substrate, and light receiving means for measuring interference of said first through nth measurement beams reflected from said work substrate and said reference beam reflected from said reference beam reflecting means as said reference beam reflecting means is moved, wherein the lengths of the optical paths of said first through nth measurement beams extending from said second splitter to said work substrate are each offset by an extent at least equal to the coherence length of interference waves detected at said light receiving means so as to ensure that the individual interference waves do not overlap, wherein, said control device calculates temperatures at the individual measurement points at said work substrate based upon interference waves induced between said first through nth measurement beams and said reference beam having been measured by said light receiving means and implements at least either temperature control or process control for said work substrate placed inside said processing chamber at said substrate processing apparatus based upon the temperatures thus calculated.

18. A control system according to claim 17, wherein:

said substrate processing apparatus includes a focus ring disposed around said work substrate placed inside said processing chamber;

at least one of said first through nth measurement beam transmitting means disposed so as to irradiate said focus ring with said measurement beam; and said control device calculates a temperature at said focus ring as well based upon the interference waves from said light receiving means so as to execute at least either the temperature control or the process control for said work substrate present inside said processing chamber at said substrate processing apparatus by taking into consideration the temperature at said focus ring as well.

19. A control system according to claim 17, wherein:

said substrate processing apparatus includes an upper electrode disposed inside said processing chamber;

at least one of said first through nth measurement beam transmitting means is disposed so as to irradiate said upper electrode with a measurement beam; and said control device calculates a temperature of said upper electrode and executes at least either temperature control or process control for said work substrate present inside said processing chamber at said substrate processing apparatus by taking into consideration the temperature at said upper electrode.

20. A control method to be adopted in a control system for a substrate processing apparatus that executes a specific type of processing on a work substrate, comprising:

splitting light originating from a light source into a temperature measurement beam and a reference beam;

further splitting, via a splitter, the temperature measurement beam into first through nth measurement beams with optical paths different from one another;

a step in which the first through nth measurement beams with optical path lengths thereof different from one another are each radiated onto one of various measurement points on a work substrate, and the reference beam is radiated onto a reference beam reflecting means;

a step in which interference of said first through nth measurement beams reflected from said work substrate with said reference beam reflected from said reference beam reflecting means is measured while altering the optical path length of said reference beam reflected from said reference beam reflecting means by moving said reference beam reflecting means along a single direction;

a step in which temperatures at various measurement points at said work substrate are measured based upon the results of the interference measurement; and a step in which at least either temperature control or process control for said work substrate at said substrate processing apparatus is executed based upon the temperatures at the individual measurement points at said work substrate having been measured, wherein the optical paths of the first through nth measurement beams are offset from each other by a distance at least equal to a coherence length of interference waves detected during the interference measurement such that individual interference waves do not overlap.

* * * * *